US012651678B2

(12) United States Patent

Thing et al.

(10) Patent No.: US 12,651,678 B2
(45) Date of Patent: Jun. 9, 2026

(54) ELECTRICAL CONDUCTOR FOR AN ELECTRICAL INSTALLATION IN A RENEWABLE ENERGY FACILITY

(71) Applicant: KK Wind Solutions A/S, Ikast (DK)

(72) Inventors: Poul Thing, Ikast (DK); Jorgen Dahl Vestergaard, Kibaek (DK); Bjorn Rannestad, Aalborg (DK)

(73) Assignee: KK Wind Solutions A/S, Ikast (DK)

( * ) Notice: Subject to any disclaimer, the term of this patent is extended or adjusted under 35 U.S.C. 154(b) by 0 days.

(21) Appl. No.: 18/714,478

(22) PCT Filed: Nov. 29, 2022

(86) PCT No.: PCT/DK2022/050250
§ 371 (c)(1),
(2) Date: May 29, 2024

(87) PCT Pub. No.: WO2023/093962
PCT Pub. Date: Jun. 1, 2023

(65) Prior Publication Data

US 2025/0174372 A1 May 29, 2025

(30) Foreign Application Priority Data

Nov. 29, 2021 (DK) ............................ PA 202170586

(51) Int. Cl.
*H01B 5/00* (2006.01)
*B33Y 80/00* (2015.01)
(Continued)

(52) U.S. Cl.
CPC .............. *H01B 5/006* (2013.01); *B33Y 80/00* (2014.12); *H01B 5/02* (2013.01); *H01B 5/12* (2013.01)

(58) Field of Classification Search
CPC . H01B 5/006; H01B 5/02; H01B 5/12; B33Y 80/00
See application file for complete search history.

(56) References Cited

U.S. PATENT DOCUMENTS

2016/0028216 A1* 1/2016 Pal ......................... H01H 85/47
361/676
2019/0001554 A1* 1/2019 Schmidt ................ C23C 16/342
(Continued)

FOREIGN PATENT DOCUMENTS

CN 105781851 7/2016
CN 207166096 3/2018
(Continued)

OTHER PUBLICATIONS

Mooraj Shahryar et al: "3D printing of metal-based materials for renewable energy applications", Nano Research, Tsinghua University Press, CN, vol. 14, No. 7, Dec. 4, 2020 (Dec. 4, 2020), pp. 2105-2132.
(Continued)

*Primary Examiner* — Timothy J Thompson
*Assistant Examiner* — Rhadames Alonzo Miller
(74) *Attorney, Agent, or Firm* — Lee & Hayes, P.C.

(57) ABSTRACT

An electrical conductor for an electrical installation. The electrical conductor includes: a first end segment; a second end segment; and a middle segment. The middle segment is formed by a plurality of conductor branches which electrically couples and mechanically couples the first end segment and the second end segment. The first end segment and conductor branches of the plurality of conductor branches are monolithically united by connections, thus shaping, concavely, corners between the first end segment and conductor branches of the plurality of conductor branches and
(Continued)

Figures 1A, 1B, 1C:
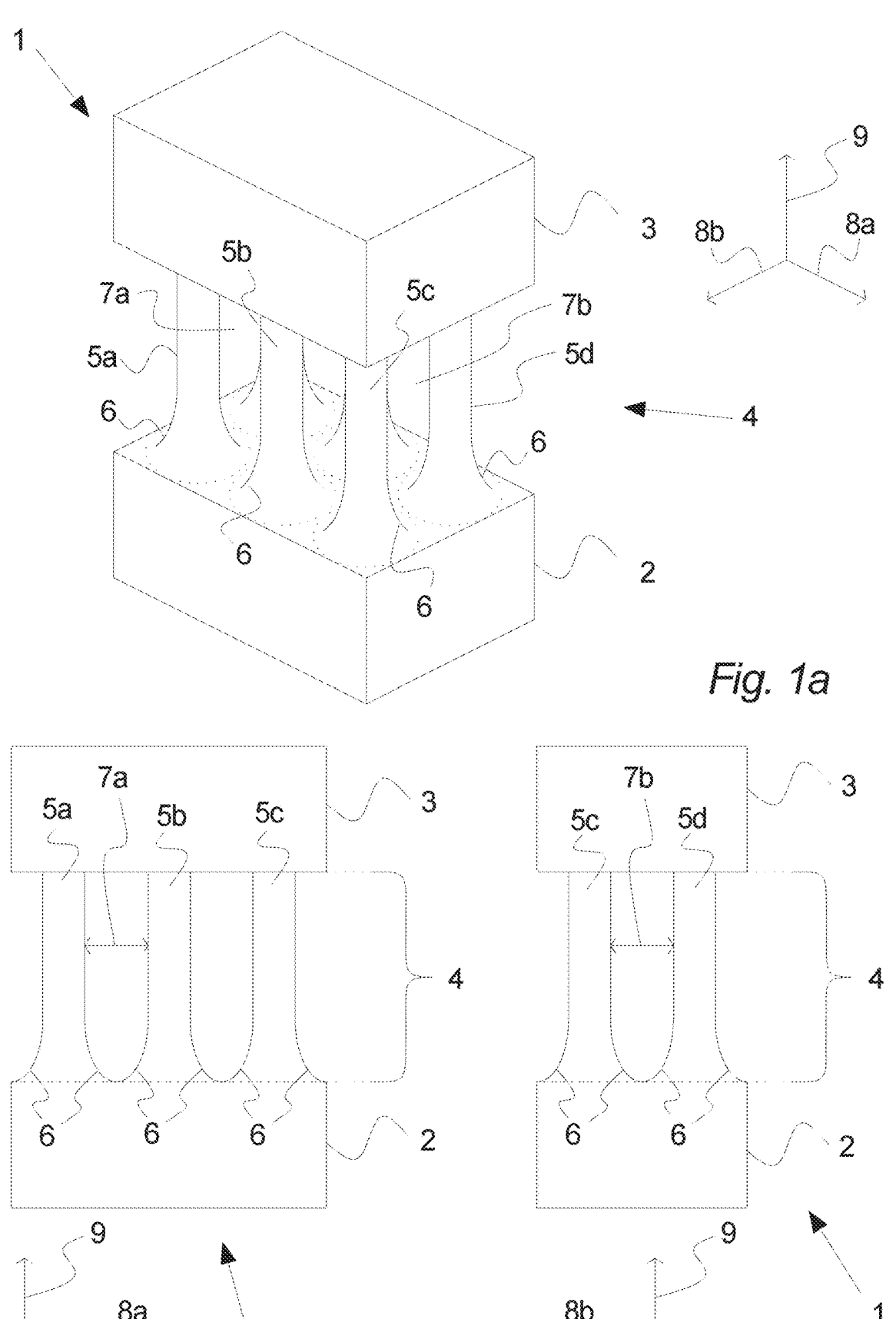

spatially separating conductor branches of the plurality of conductor branches in two different transversal directions.

23 Claims, 12 Drawing Sheets

(51) Int. Cl.
  *H01B 5/02*         (2006.01)
  *H01B 5/12*         (2006.01)

(56)              References Cited

U.S. PATENT DOCUMENTS

| | | | | |
|---|---|---|---|---|
| 2019/0078945 | A1* | 3/2019 | Chijioke | H01F 7/1844 |
| 2019/0316460 | A1* | 10/2019 | Mannas | F28F 7/02 |
| 2020/0284519 | A1* | 9/2020 | Becene | F02C 7/14 |
| 2021/0281001 | A1* | 9/2021 | Klawinski | H01R 13/426 |
| 2024/0138736 | A1* | 5/2024 | Pederson | A61B 18/1492 |
| 2024/0223027 | A1* | 7/2024 | Oettel | H02K 3/28 |

FOREIGN PATENT DOCUMENTS

| | | |
|---|---|---|
| DE | 102009033370 | 12/2011 |
| EP | 3705827 | 9/2020 |
| JP | 2017095034 | 6/2017 |
| KR | 101464674 | 11/2014 |
| KR | 20210113001 | 9/2021 |

OTHER PUBLICATIONS

Aplicaciones Tecnologicas: "Copper-Clad Aluminium Bimetal Conductor", Jun. 13, 2016 (Jun. 13, 2016), pp. 1-1, Retrieved from the Internet: URL :https://at3w.com/upload/pdf_producto/AT-236D_I. PDF.
Danish Search Report for corresponding Danish Patent Application No. PA 2021 70586 dated Jun. 14, 2022, 4 pages.
Ekv Gmbh : "Kabel Flexible bars", Sep. 18, 2019 (Sep. 18, 2019), Retrieved from the Internet: URL:https://www.ekv-gmbh.de/wp-content/uploads/2019/09/EKV- Titel_Katalog_2019_view.pdf, pp. 1-32.
PCT Search Report for corresponding PCT Application No. PCT/DK2022/050250 dated Feb. 27, 2023, 4 pages.
Cewe, "Shunts", Mar. 4, 2005 (Mar. 4, 2005), pp. 1-2, Retrieved from the Internet: URL:https://www.distrelec.biz/Web/Downloads/s_/en/smCEWE-Shunts_en.pdf.

* cited by examiner

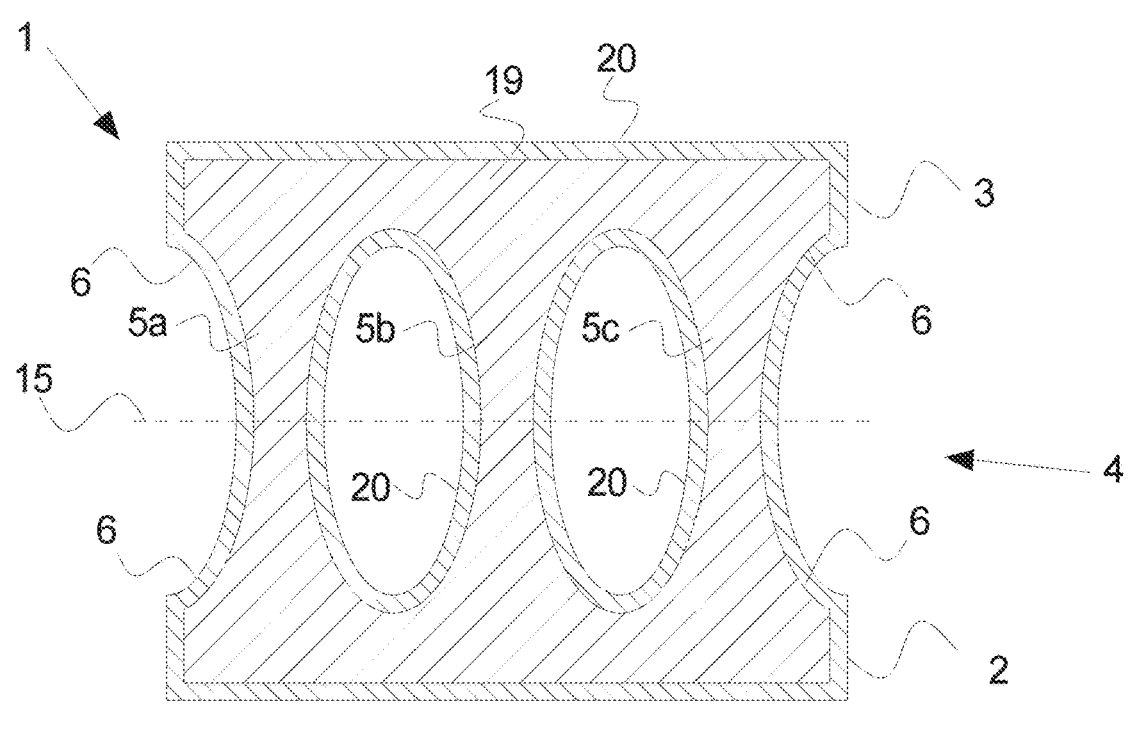
*Fig. 6a*
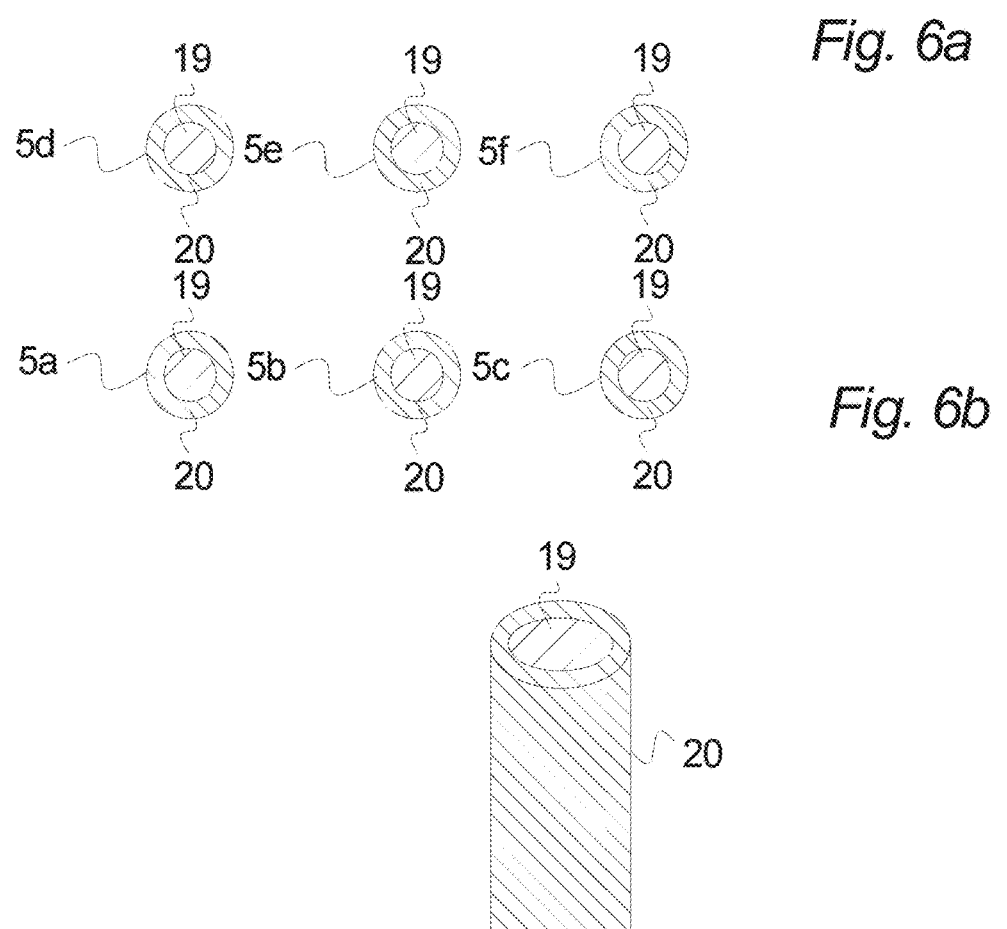
*Fig. 6b*
*Fig. 6c*

ELECTRICAL CONDUCTOR FOR AN ELECTRICAL INSTALLATION IN A RENEWABLE ENERGY FACILITY

This Application claims priority to PCT Application No. PCT/DK2022/050250, filed Nov. 29, 2022, which claims priority to DK Patent Application No. PA 2021 70586, filed Nov. 29, 2021, the contents of each of which is incorporated herein by reference.

FIELD OF THE INVENTION

The present invention relates to an electrical conductor for an electrical installation e.g. in a renewable energy facility. The invention further relates to a method for coupling end segments of such an electrical conductor.

BACKGROUND OF THE INVENTION

Renewable energy facilities are a crucial part of transitioning into environmental and sustainable energy production. This transition is highly demanded worldwide due to the threatening prospects of climate changes.

Since renewable energy facilities typically rely on energy sources provided directly by a natural environment, they may be subject to strong vibrations and extreme weather conditions. One example is photovoltaic power stations, which are exposed to outside weather all year, potentially including intense heat and frost. Another example is wind turbines, in which extreme forces are at play.

A complicating factor is the presence of high currents and/or high voltages in renewable facilities, which has to be tackled simultaneously with the weather and vibrations.

Weather, vibration, and electrical power conditions generally tend to heighten the requirements of equipment and components to be used in renewable energy facilities.

Hence, there is a need for inexpensive equipment and components which are able to tolerate the conditions of renewable energy facilities.

SUMMARY OF THE INVENTION

The inventors have identified the above-mentioned problems and challenges related to renewable facility components, and subsequently made the below-described invention which may improve such components.

An aspect of the invention relates to an electrical conductor for an electrical installation, said electrical conductor comprising:
a first end segment;
a second end segment; and
a middle segment formed by a plurality of conductor branches which electrically couples and mechanically couples said first end segment and said second end segment,
wherein said first end segment and conductor branches of said plurality of conductor branches are monolithically united by connections thus shaping interior corners between said first end segment and conductor branches of said plurality of conductor branches and spatially separating conductor branches of said plurality of conductor branches in two different transversal directions.

In an embodiment of the invention, said electrical conductor is configured for being installed in an electric panel in a renewable energy facility.

In an embodiment of the invention, said interior corners are formed as concavely rounded interior corners.

As mentioned below, the conductor branches may "grow" from the end segment(s) substantially perpendicular to the transverse direction of the end segment(s). However, to increase structural strength of the electric conductor, the end segment(s) and conductor branches are monolithically united by rounded connections thus shaping concavely rounded interior corners between the end segment(s) and conductor branches.

An electrical conductor according to the invention may be used to facilitate damping of vibrations, e.g. in the electrical installation, which is advantageous. Particularly, by having an electrical conductor wherein the end segments are coupled electrically and mechanically by a plurality of conductor branches, via monolithically uniting rounded connections, which spatially separates conductor branches in two different transversal directions, the electrical conductor may be capable of improved vibrational damping in any of the transversal directions while potentially minimizing the risk of structural damage, which is advantageous.

Further, the spatial separation of conductor branches in two transversal directions may permit improved heat dissipation while potentially minimizing the risk of the above-mentioned structural damage, which is advantageous.

Large currents and varying weather conditions may result in a large span of temperatures in renewable energy facilities. By having the plurality of conductor branches monolithically united to the first end segment by rounded connections and distributed in two transversal directions, the electrical conductor may be able to better tolerate thermal expansion under such conditions, which is advantageous.

The so-called skin effect is the tendency that electrical AC currents tend to flow mainly near the surface of a conductor. This effect may introduce additional AC resistivity in conductors. By having a plurality of conductor branches, the surface area may potentially be increased, at least locally in the middle segment, thus reducing AC resistivity, which is advantageous. Simultaneously, rounded monolithic connections may facilitate the formation of the plurality of conductor branches in the middle segment while minimizing conduction loss which may otherwise occur at sharp corners and/or interfaces, which is advantageous.

Additionally, by spatially separating the conductor branches, the obstructions otherwise caused by installation of an electrical conductor are reduced, which is advantageous. The spatial separation between conductor branches permit visual access to components and elements located behind the electrical conductor. Further, other components, such as wires or a load-bearing structure may be lead through the spatial separations. And the spatial separation may permit tools, e.g. a screwdriver, to be applied to components behind the electrical element. If tools or components are intended to be lead through the spatial separations, at least some of the branches may optionally be electrically isolated by an electrical isolation. Reduced obstruction of the electrical conductor may further advantageously permit easier installation.

Furthermore, the plurality of conductor branches monolithically united with the first end segment by rounded connections ensures that material may be saved without substantially increasing the risk of structural damage due to stress concentration at corners, which is advantageous. Saving material may for example be considered in comparison with a conventional electrical conductor having a form of a rod or a hyperrectangle with no middle segment formed by a plurality of branches with spatial separation. By saving material, an electrical conductor may both be cheaper to manufacture, and have a smaller environmental impact.

Note, that it is particularly challenging to reduce weight and amount of material of a component, such as an electrical conductor, which has requirements relating to vibrational damping, susceptibility to structural damage, and/or current carrying capabilities. Simply removing material may not be feasible since it may lower the capabilities of the electrical conductor below its requirements for a given application, e.g., a particular electrical installation in a particular renewable energy facility. Thus, the prospect of saving/removing material may be evaluated in combination with minimally reducing, maintaining, or even improving other attributes of the electrical conductor.

An electrical conductor may be understood as an object or element for facilitating flow of charge. An example of an electrical conductor is a busbar. Other examples of electrical conductors are cable or wire arrangements. A busbar may for example be used to connect high voltage and/or high current equipment or terminals in electrical converter installations within a wind turbine. Typically, a material of an electrical conductor is metal, for example silver, copper, gold, aluminum, one or more other metals, or any combination thereof.

An electrical conductor may for example be installed/integrated in electrical installation in a renewable energy facility. An example of an electrical installation is a converter, such as an AC-DC converter, DC-AC converter, AC-AC converter, or DC-DC converter. Such converters are often crucial for correctly and reliably converting electrical power e.g. from one to another between the renewable energy facility and the electrical grid. Other examples of an electrical installations are an uninterruptable power supply (UPS), a power supply, a switch module, and electrical installations provided in electrical cabinets in general.

Examples of renewable energy facilities are renewable energy power plants such as wind turbines, photovoltaic power stations, hydropower power plants, bioenergy power plants, and geothermal energy power plants. Other examples of renewable energy facilities are power storage facilities such as battery-based power storage facilities, and power-to-x facilities such as electrolysis facilities.

A first end segment and a second end segment of an electrical conductor may be understood as the two ends of an electrical conductors which are distal relative to each other. An electrical conductor may thus be used to electrically and mechanically couple two otherwise disconnected electrical terminals/connectors, for example by connecting the first end segment to one terminal/connecter and connecting the second end segment to the other terminal/connector.

A middle segment may be understood as a segment electrically and mechanically coupling the first and the second end segments. In some embodiments, the middle segment might not necessarily be in direct contact with both end segments. It may, for example just be monolithically united with the first end segment, whereas a fourth segment is located between the second end segment and the middle segment.

Note that embodiments of the invention are not restricted to having just two end segments. Some electrical conductors may function as distribution conductors, which supply/distribute current and/or voltage to several electrical terminals and/or circuits. Such electrical conductors may have more than two end segments. Further, embodiments of the invention may have several distinct middle segments. Accordingly, embodiments of the invention may comprise more segments than just two end segments and one middle segments, for example a fourth segment located between the second end segment and the middle segment.

A conductor branch may be understood as an elongated protrusion for facilitating flow of charge and damping of vibrations (typically in combination with other conductor branches). In some embodiments, each conductor branch has the shape of a cylindrical rod (except at its connection with the first end segment, where it is rounded by its connection to the end segment). In other embodiments, conductor branches have a more irregular shapes, for example in similarity with a wooden tree branch. A conductor branch may fork into two, or even more than two diverging conductor branch twigs. Such diverging conductor branch twigs may connect with other conductor branches.

That the first end segment and the conductor branches are monolithically united may be understood as conductor branches and the first end segment consisting of a single unit, part, or piece. For example, the conductor branches may be united with the first end segment without seams or joints. Several methods of manufacturing exist for realizing such monolithic unison, for example, casting the conductor branches and the first end segment as a single piece, machining (e.g., milling, e.g., via a CNC machine) the conductor branches and the first end segment from a single piece of bulk material, or additive manufacturing of the conductor branches and the first end segment. When casting, as an example, lost core injection molding and/or or molding with side action/side pull may be employed for manufacturing complex conductor branch shapes. However, note that the invention is not restricted to these exemplary methods. Note further that the entire first end segment and the entire middle segment are not restricted to being monolithic, but at least some of the conductor branches and should be monolithically united with the first end segment.

According to embodiments of the invention, conductor branches are monolithically united with the first end segment by rounded connections thus shaping concavely rounded interior corners between the first end segment and conductor branches. Such rounded connections may alternatively be referred to as fillets. And a conductor branch with a fillet med also be referred to as a filleted conductor branch. Due to the concavely rounded interior corners, the width of a conductor branch (including the rounded corner) is typically larger at its connection with the first end segment, than away from its connection with the first end segment.

The presence of concavely rounded interior corners between the first end segment may to some degree spatially separate at least some of the conductor branches in a transversal direction. In embodiments of the invention, at least two conductor branches are spatially separated in one transversal direction, and at least two branches are spatially separated in another transversal direction.

A transversal direction may be substantially transversal or substantially perpendicular to the orientation of the majority of the conductor branches. And/or it may be substantially transversal or substantially perpendicular to a lengthwise direction. And/or it may be substantially transversal or substantially perpendicular to a direction of the electrical and/or mechanical coupling between the first end segment and the second end segment.

Generally, when referring to conductor branches of said plurality of conductor branches, such a reference may not necessarily refer to all conductor branches of the plurality of conductor branches, but just a subset (e.g., at least two conductor branches) of the plurality of conductor branches.

In embodiments of the invention, said plurality of conductor branches are monolithically united via said first end segment and via said second end segment.

In embodiments of the invention, said second end segment and conductor branches of said plurality of conductor branches are monolithically united by rounded connections thus shaping concavely rounded interior corners between said second end segment and conductor branches of said plurality of conductor branches and spatially separating conductor branches of said plurality of conductor branches in said two different transversal directions.

The rounded connections between the second end segment and conductor branches of the plurality of conductor branches may have similar properties and characteristics as the rounded connections between the first end segment and conductor branches of the plurality of conductor branches. By having rounded connections between the second end segment and conductor branches of the plurality of conductor branches in addition to having rounded connection between the first end segment and conductor branches of the plurality of conductor branches, an electrical conductor may be further improved, for example for similar reasons as having rounded connection between the first end segment and conductor branches of the plurality of conductor branches may improve an electrical conductor.

In embodiments of the invention, said plurality of conductor branches form a web structure between said first end segment and said second end segment.

In embodiments of the invention, said first end segment and said second end segment is at least partly formed as a web structure.

This is advantageous in that weight is reduced and heat dissipation is increased. To ensure sufficient structural strength at the terminals, the part of the end segments comprising the terminals are typically manufactured in a solid form. This part may be limited to a minor part surrounding terminal such as surrounding a hole through the end segment.

In embodiments of the invention, said plurality of conductor branches are mutually twisted without physical contact between the individual conductor branches in the longitudinal direction of the middle segment.

The conductor branches are both electrically and mechanically connected at the end segments, but along the longitudinal direction of the middle segment, in this embodiment, there are no electric and mechanically connection between the individual conductor tranches. In other words, even though the conductor branches are twisted, they are not in connected (electric or mechanically).

A mutually twisted design of the electric conductor may benefit from one or more of the following advantages reduce AC losses in high frequency windings, increased efficiency, mitigation of skin effect, mitigation of proximity effect, minimum eddy current losses, lower operating temperatures, reduced footprint of final product and a substantial weight reduction.

A twisted conductor design is advantageous in that such design allows for obtaining tolerances both in the longitudinal direction, sideways, and axial In embodiments of the invention, said electric conductor comprises a cooling structure extending from the longitudinal direction of said middle section.

The cooling structure may extend from the electric conductor in a direction substantially perpendicular to the longitudinal direction of the middle section. The cooling structure may be designed as a web or similar having high heat dissipation capabilities. The cooling structure may comprise an air guiding fin that forces part of an air flow through the cooling structure In embodiments of the invention, said electric conductor comprises a plurality of cooling structures spaced apart from with a distance facilitating the mounting of a ferrite core between two cooling structures.

Spacing ferrite cores with cooling structures is advantageous in that it has the effect, that the ferrite cores are kept in place while the electric conductor is still able to dissipate heat via the cooling structures.

In embodiments of the invention, said cooling structures extends further away from said electric conductor than said ferrite core.

Letting the cooling structures extend longer from the conductor than the ferrite cores is advantageous in that the cooling structure is in contact with air flow used for cooling. Thus, even though the conductor is wrapped in ferrite cores, it is still possible to cool the conductor.

In embodiments of the invention, one or more conductor branches of said plurality of conductor branches have an internal cooling channel.

An internal cooling channel may further be fluidly coupled with an external environment through a cooling channel opening in the first end segment and/or a cooling channel opening the second end segment.

An internal cooling channel may facilitate and improve cooling of the electrical conductor, and particularly of the conductor branches, which is advantageous. Furthermore, a cooling channel may enable a further reduction of material, which is advantageous.

Internal cooling channels may facilitate air cooling, and/or liquid cooling. Either way, an internal cooling channel may be fluidly coupled to flow generation means, such as a pump or a fan, for generating fluid flow in the channel.

Further, an internal cooling channel may at least partially facilitate transportation of fluid for cooling between components, e.g., components of an electrical installation. For example, a fluid needs to be transported from a fluid pump to a processor which requires cooling fluid, and by integrating a cooling channel in a conductor branch, a separate fluid conductor for transporting fluid from may not need not to be installed in the electrical installation, which is advantageous.

A cooling channel may further permit using less material to manufacture the electrical conductor, which is advantageous.

In some embodiments, only one conductor branch has a cooling channel, in some embodiments several conductor branches have a cooling channel, and in some embodiments all of the conductor branches have a cooling channel.

Generally, inputs and outputs of an internal cooling channel may be placed in any position of either of the end segments, or even in a conductor branch. The inputs and outputs may optionally include electrical isolation for providing galvanic isolation between the bulk of the electrical conductor and a cooling pipe attached to the electrical conductor.

In embodiments of the invention, two conductor branches of said plurality of conductor branches are mechanically coupled and electrically coupled by a transversal branch outgrowth.

In embodiments of the invention, said middle segment is a first middle segment, wherein said electrical conductor further comprises a second middle segment formed by a second plurality of conductor branches which also electrically couples and mechanically couples said first end segment and said second end segment.

In an embodiment of the invention, said second end segment and conductor branches of said second plurality of conductor branches are monolithically united by rounded connections thus shaping concavely rounded interior corners between said second end segment and conductor branches of said second plurality of conductor branches and spatially separating conductor branches of said second plurality of conductor branches in said different transversal directions.

In embodiments of the invention, said electrical conductor is monolithic.

In embodiments of the invention, said electrical conductor is at least partly manufactured by an additive manufacturing process.

An additive manufacturing process is suitable for manufacturing complex shapes and is thus advantageous to employ for manufacturing a middle segment formed by a plurality of conductor branches.

In an embodiment of the invention, said electric conductor comprises two or more central body segments, wherein the geometry of the conductor parts connected to the same central body segment are different.

In an embodiment of the invention, said electric conductor comprises two central body segments connected with an inductor part.

In an embodiment of the invention, a ferrite core is connected through said inductor part.

Different conductor geometry of the conductor connected to a central body segment is advantageous in that it enables the different types of connection of the electrical conductor to additional electric systems. Further, it allows to e.g. design part of an electric conductor for a specific purpose such as an inductor through which a ferrite core can extent. In this way it may be possible to limit the need for several ferrite cores to one single ferrite core.

In embodiments of the invention, a branch diameter of a conductor branch of said plurality of conductor branches is less than 3 cm, for example less than 2.5 cm, for example less than 2 cm, such as less than 1.5 cm.

Such exemplary branch diameters may advantageously provide the necessary mechanical and electrical properties required, which is advantageous.

A branch diameter may be measured at the smallest diameter of the branch.

In embodiments of the invention, a conductor branch of said plurality of conductor branches has a rounded connection shaping one or more concavely rounded interior corners having a corner radius of at least 0.2 branch diameters of that conductor branch, for example at least 0.3 branch diameters, for example at least 0.5 branch diameters, for example at least 0.8 branch diameters, such as at least 1.2 branch diameters.

In embodiments of the invention, a conductor branch of two neighboring conductor branches of said plurality of conductor branches has a rounded connection shaping one or more concavely rounded interior corners having a corner radius of at least 0.05 neighbor spacings of said two neighboring conductor branches, for example at least 0.1 neighbor spacings, for example at least 0.2 neighbor spacings, for example at least 0.3 neighbor spacings, such as at least 0.4 neighbor spacings.

Having one or more rounded corners with radii of at least at particular size relative to neighbor spacing (or branch diameter) ensures that these corners can sustain vibrations while minimizing the risk of damage due to stress concentration, which is advantageous.

However, note that the invention is not limited to corners of circular, elliptical, parabolic, hyperbolic, or any other shapes. Nevertheless, at least some embodiments have corners with rounded connection, where the material of the electrical conductor is spatially disposed in such a manner that the outer surface of a given rounded connection lies outside an arc of a circle with a particular radius.

In embodiments of the invention, said electrical conductor has a resonance vibration frequency associated with relative motion between said first end segment and said second end segment.

, said resonance vibration frequency is at most 300 Hz, for example at most 150 Hz, for example at most 70 Hz, for example at most 30 Hz, for example at most 20 Hz or wherein said resonance vibration frequency is at least 300 Hz, for example at least 500 Hz, for example at least 1 kHz, such as at least 5 kHz.

In embodiments of the invention, said electrical conductor comprises an inner bulk structure, and an outer surface structure, wherein said inner bulk structure and said outer surface structure have different material compositions.

In embodiments of the invention, any of said first end segment and said second end segment comprise at least one fastener hole for electrically and mechanically connecting said electrical conductor to electrical terminals.

For example, electrical terminals of an electrical installation. The fastener holes may also be referred to as the terminals of the electric conductor.

In an embodiment of the invention, said electric conductor comprises a first part having a first outer diameter and a second part, having a second outer diameter, wherein said first diameter is larger than said second diameter.

The first and second parts may be twisted parts. The outer diameter is of the total twisted conductor i.e. measurable by a vernier caliper. This has the advantage that if the coiled part has the minor diameter this leads to a requirement of a smaller window of a core having a part/leg around which the coiled part is wrapped around. Thereby is obtained a more compact core reduced in size, weight and cost.

An aspect of the invention relates to method for coupling a first end segment of an electrical conductor to a second end segment of said electrical conductor within an electrical installation, said method comprising the steps of:

monolithically uniting said first end segment and conductor branches of a plurality of conductor branches via connections to shape interior corners between said first end segment and conductor branches of said plurality of conductor branches and to spatially separate conductor branches of said plurality of conductor branches in two different directions, and electrically coupling and mechanically coupling said first end segment and said second end segment via a middle segment of said electrical conductor formed by said plurality of conductor branches.

The method for coupling a first end segment and a second end segment of an electrical conductor according to the invention, may potentially provide any advantages of electrical conductors according to the invention.

In embodiments of the invention, said electric installation is comprised by a renewable energy facility.

In embodiments of the invention, said connections are rounded connections shaping concavely rounded interior corners between said first end segment and said conductor branches of said plurality of conductor branches.

In embodiments of the invention, said electrical conductor is an electrical conductor according to any of the embodiments of this disclosure.

In embodiments of the invention, said method comprises a step of establishing a digital representation of said electrical conductor.

In embodiments of the invention, said method comprises a step of performing digital geometry optimization of said digital representation of said electrical conductor to at least partially form said plurality of conductor branches.

In embodiments of the invention, said method comprises a step of additively manufacturing said electrical conductor based on said digital representation of said electrical conductor.

Additive manufacturing permits simplified production of complex geometrical shapes, such as an electrical conductor according to the invention, which is advantageous. Particularly, geometrical features of the electrical conductor, such as conductor branches, may be directly manufactured additively, while establishing spatial separation of conductor branches in two different transversal directions.

Moreover, additive manufacturing may reduce the number of steps required for manufacturing, which is advantageous. However, note that embodiments of the invention are not restricted to a particular number of manufacturing steps.

In embodiments of the invention, said step of additively manufacturing said electrical conductor comprises selective laser melting.

Selective laser melting may alternatively be referred to as or involve direct metal laser melting and powder bed fusion.

In embodiments of the invention, said step of additively manufacturing said electrical conductor comprises wire arc additive manufacturing.

Wire arc additive manufacturing may be particularly suited for manufacturing electrical conductors according to the invention relatively cheaply.

In embodiments of the invention having different structures of different materials, these different structures may or may not be manufactured additively. In some embodiments, one structure of the electrical conductor is manufactured additively, whereas another structure is manufactured by a different process.

An aspect of the invention relates to an electrical installation for a renewable energy facility, said electrical installation comprising an electrical conductor according to any of the embodiments of this disclosure.

The electrical installation may for example be any of a converter, an uninterruptable power supply, a power supply, and a switch module.

An electrical installation having an electrical conductor according to the invention may facilitate advantages of the electrical conductor.

An aspect of the invention relates to renewable energy facility comprising an electrical installation comprising an electrical conductor according to any of the embodiments of this disclosure.

The renewable energy facility may for example by any of a wind turbine, a photovoltaic power station, a hydropower power plant, a bioenergy power plant, a geothermal energy power plants, a power storage facility, and a power-to-x facility.

A renewable energy facility having an electrical conductor according to the invention may facilitate advantages of the electrical conductor.

An aspect of the invention relates to use of additive manufacturing for at least partly manufacturing an electrical conductor of an electrical installation of a renewable energy facility.

Using additive manufacturing for manufacturing an electrical conductor of a renewable energy facility is advantageous since it may permit tailoring the electrical conductor to the conditions of the renewable energy facility.

In embodiments of the invention, said electrical conductor is an electrical conductor according to any of the embodiments of this disclosure.

An aspect of the invention relates to an electrical conductor elongated in a longitudinal direction, said electrical conductor comprising:

an inner bulk structure, and an outer surface structure, wherein said inner bulk structure and said outer surface structure have different material compositions, wherein a conductance of said outer surface structure is larger than a conductance of said inner bulk structure.

THE DRAWINGS

Figure 2:
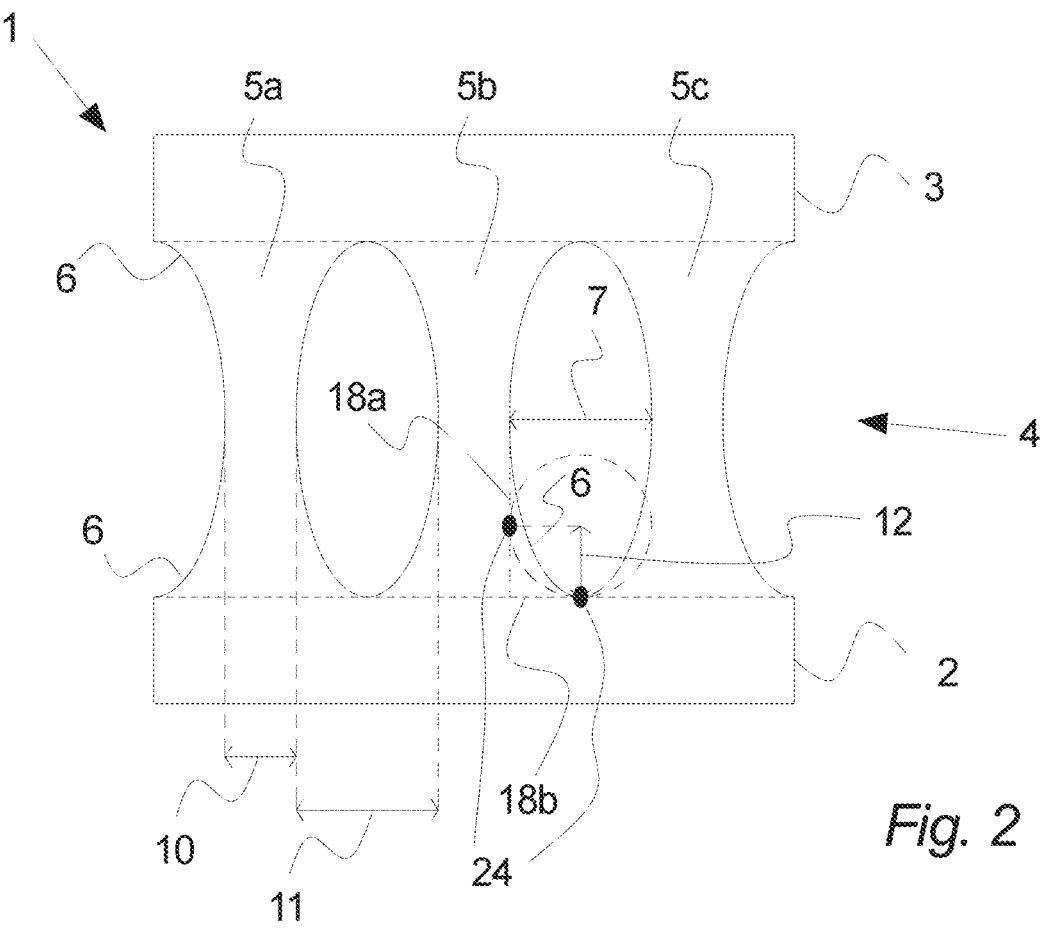
Figure 3:
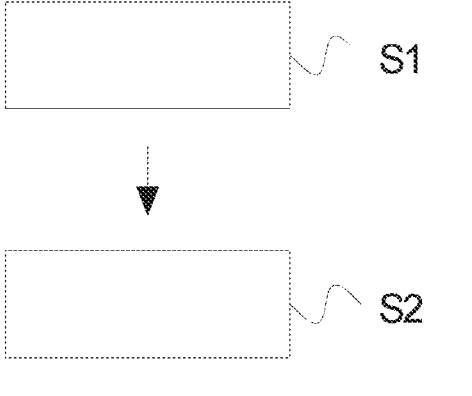
Figures 4A, 4B, 4C, 4D:
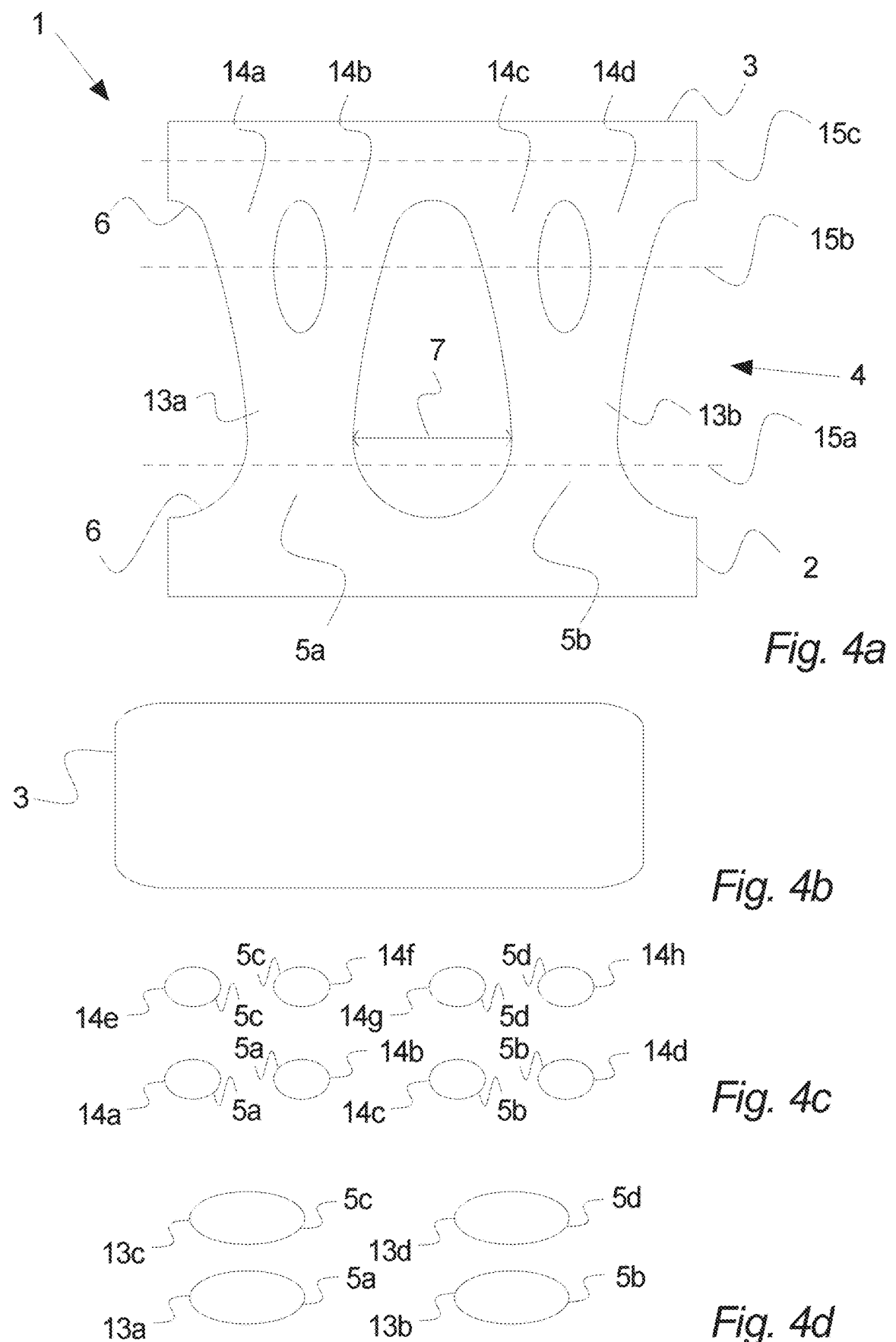
Figures 5A, 5B:
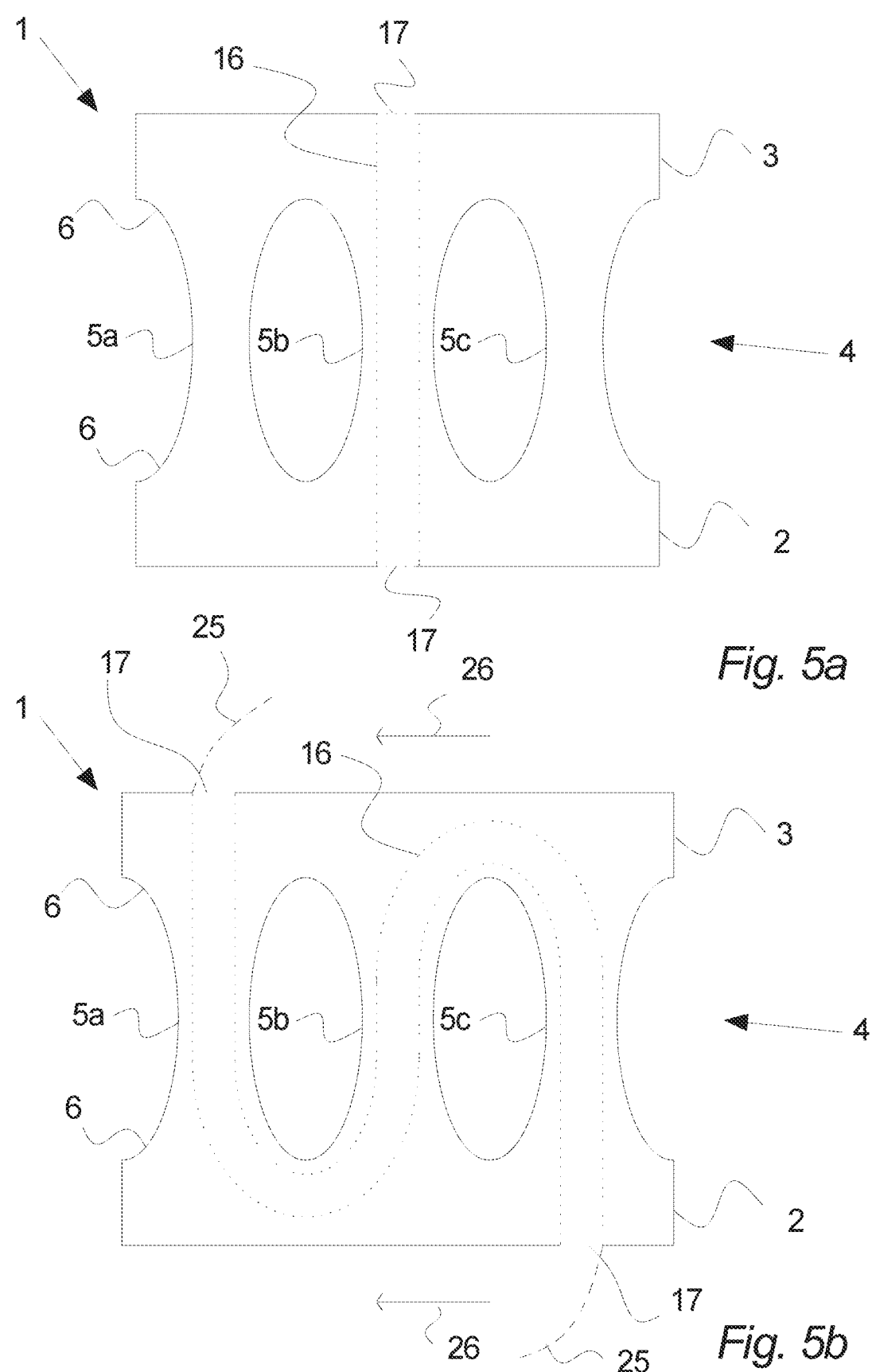
Figure 7A:
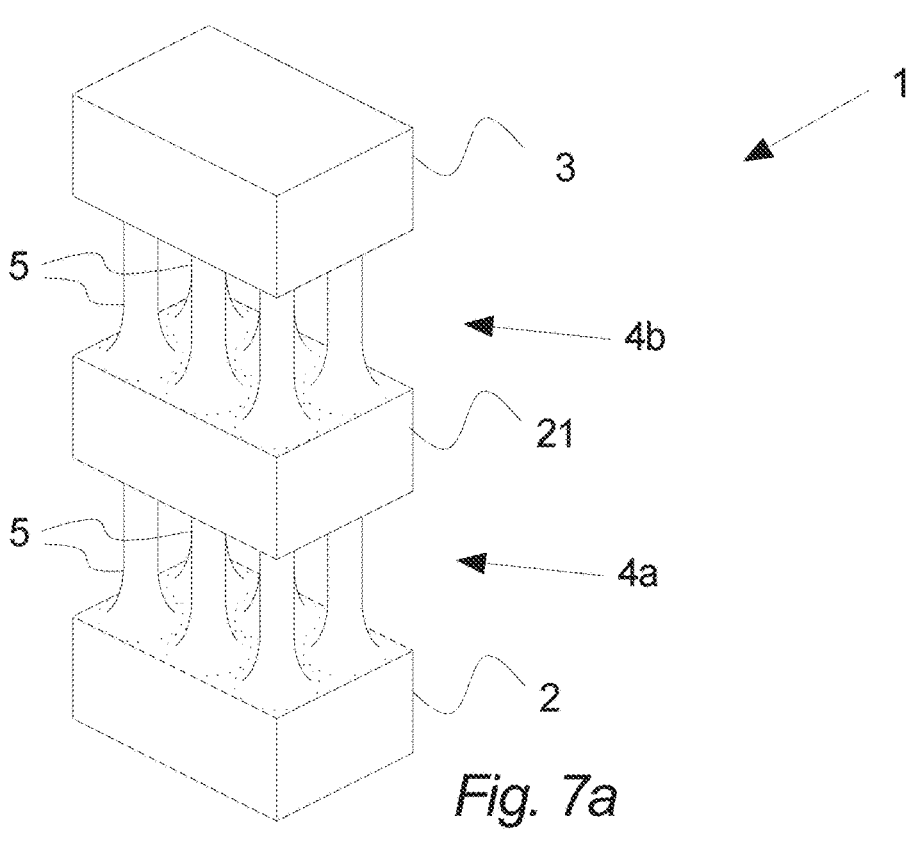
Figure 7B:
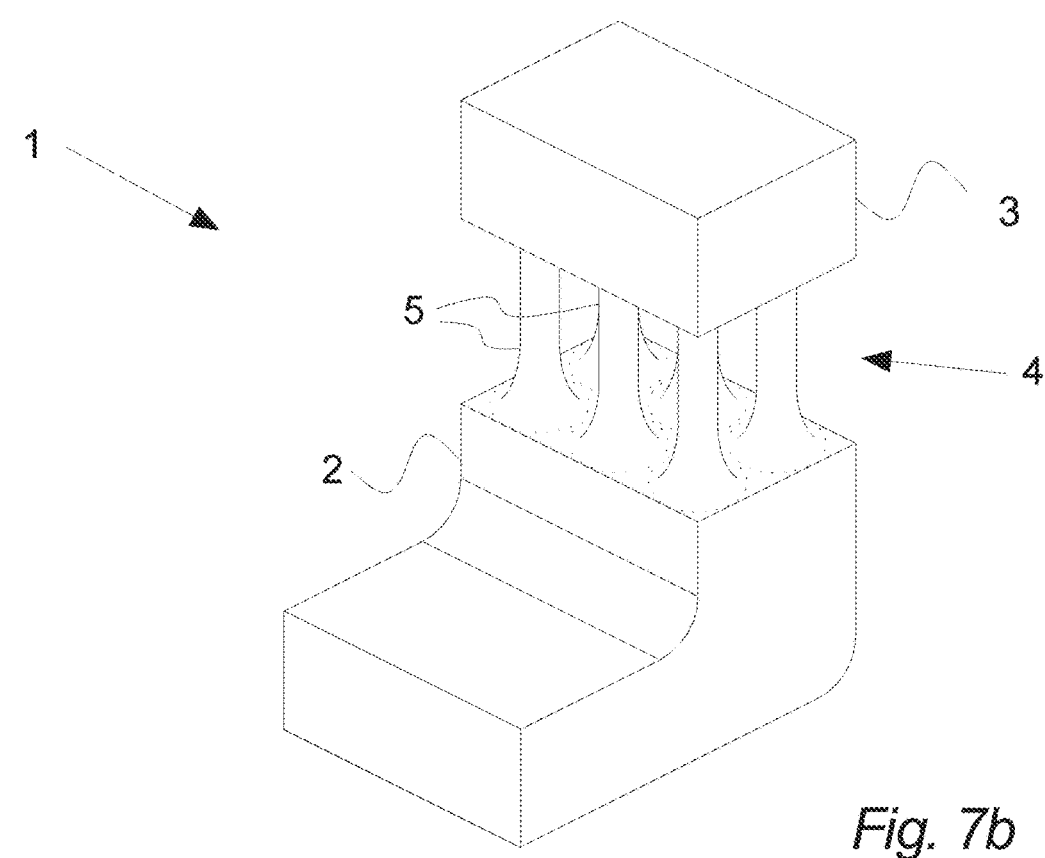
Figure 8:
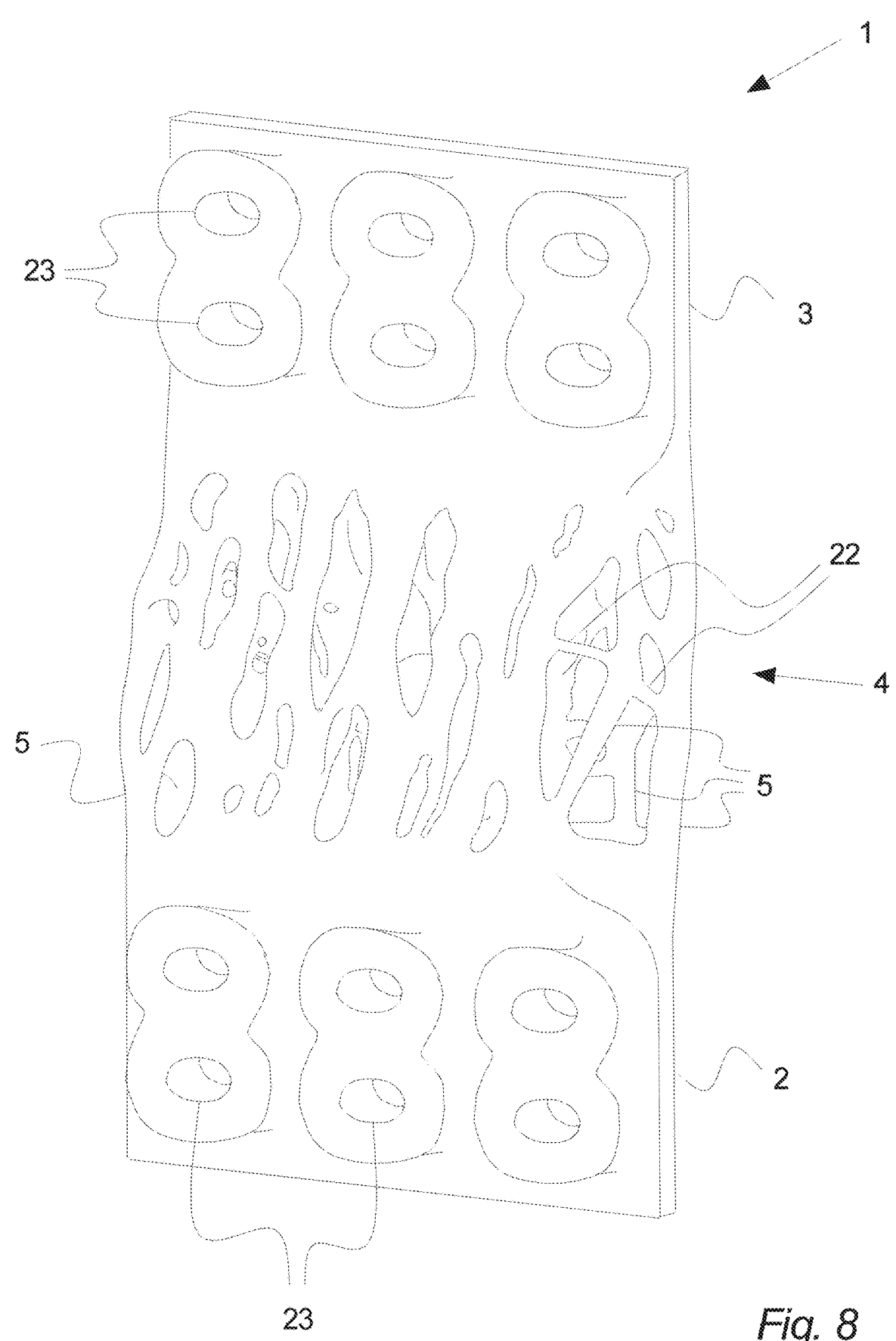
Figure 9:
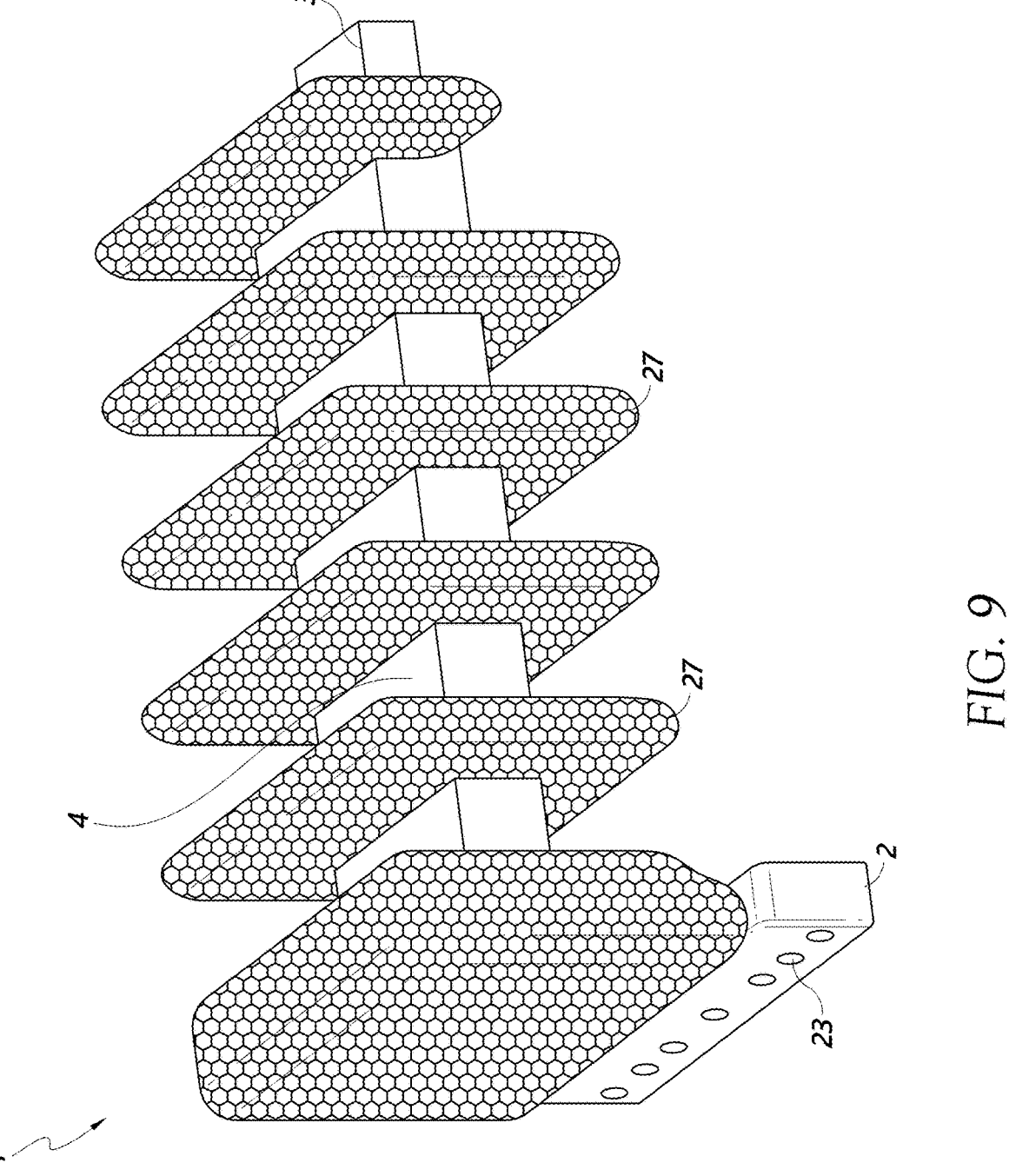
Figure 10:
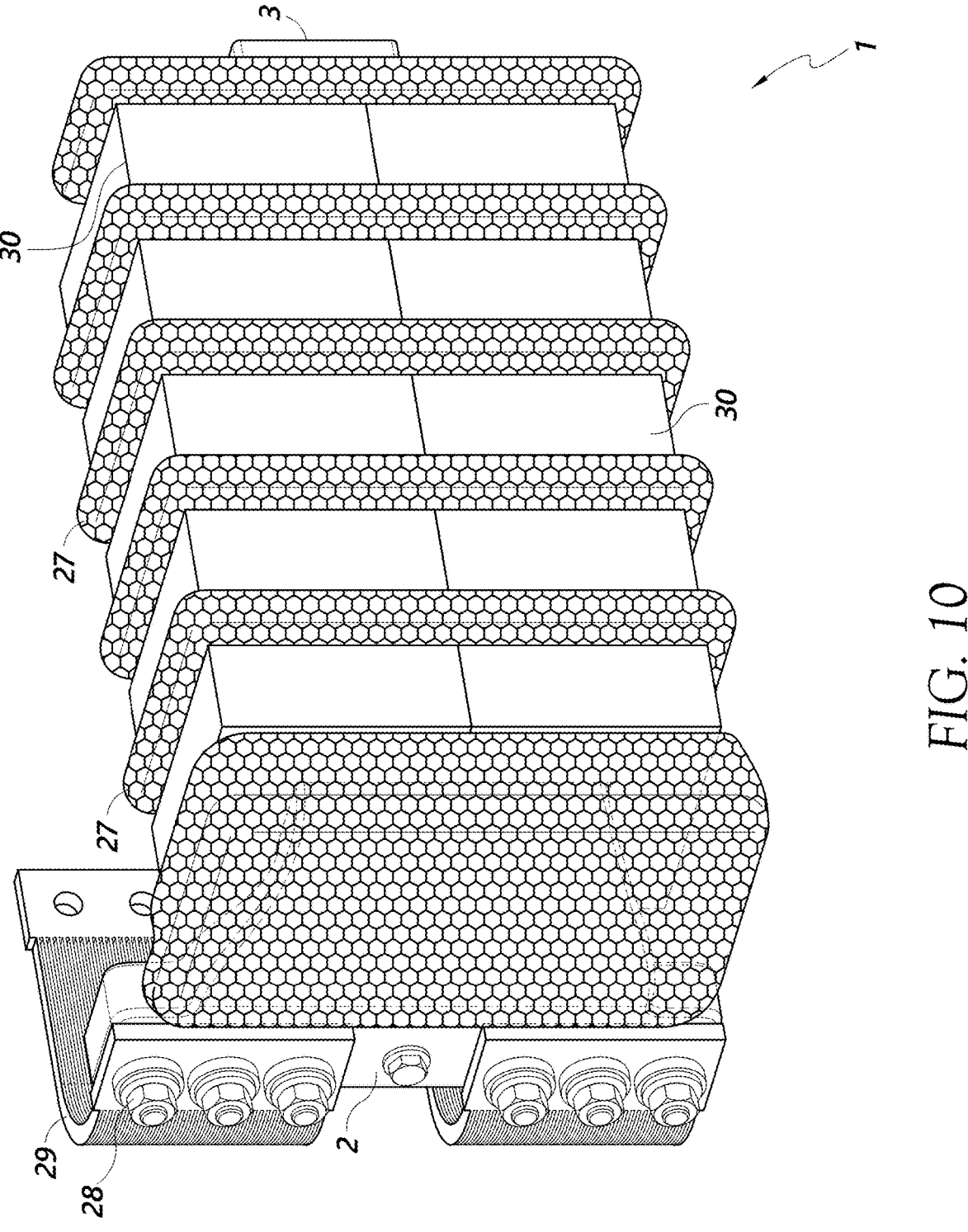
Figure 11:
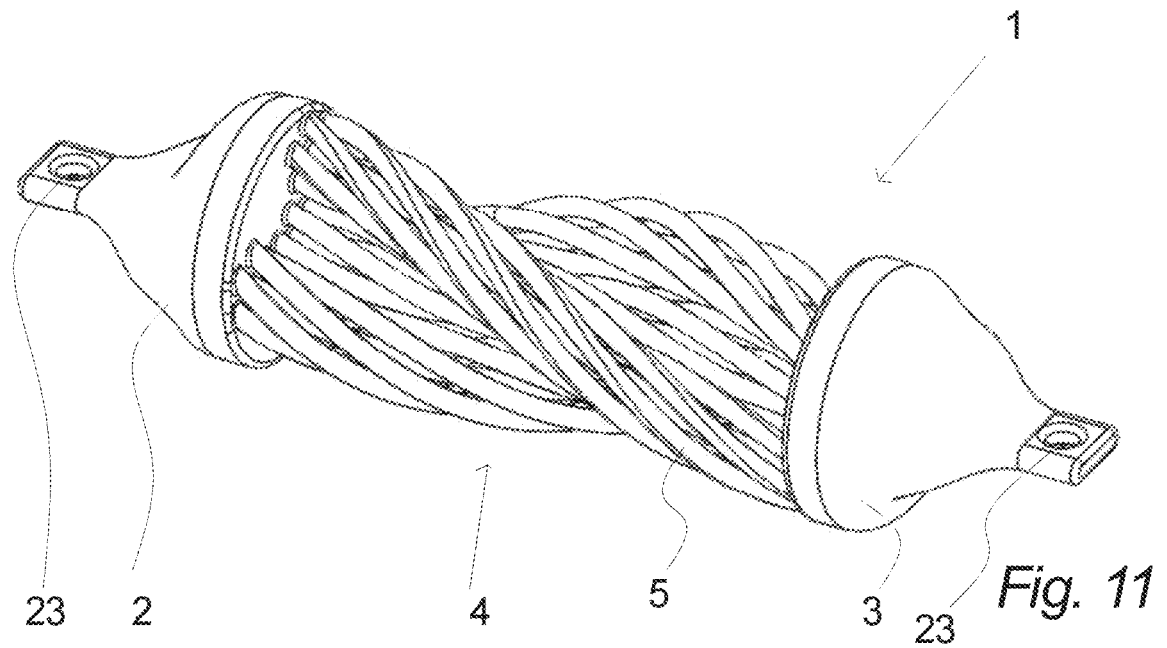
Figure 12:
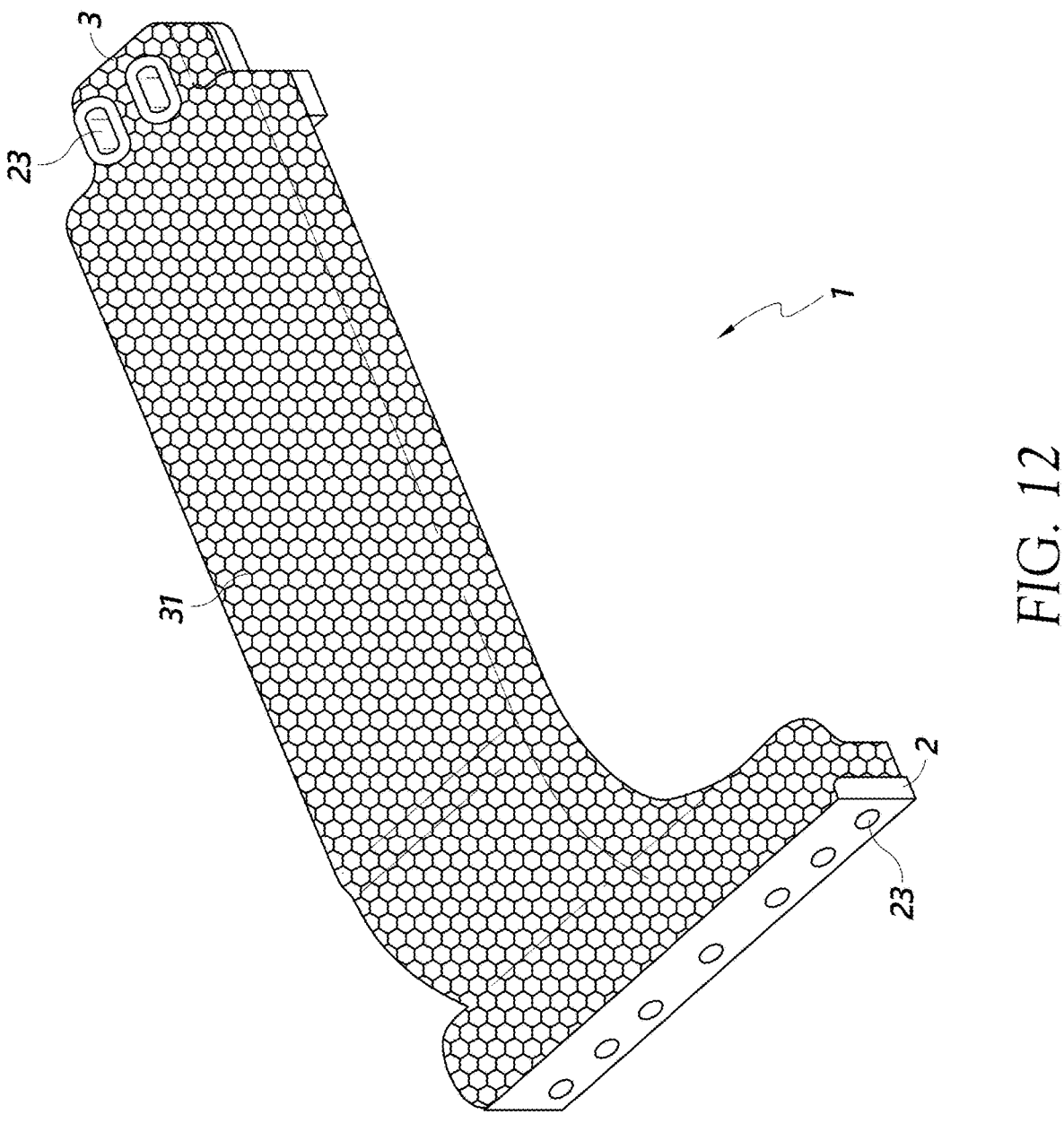
Figure 13:
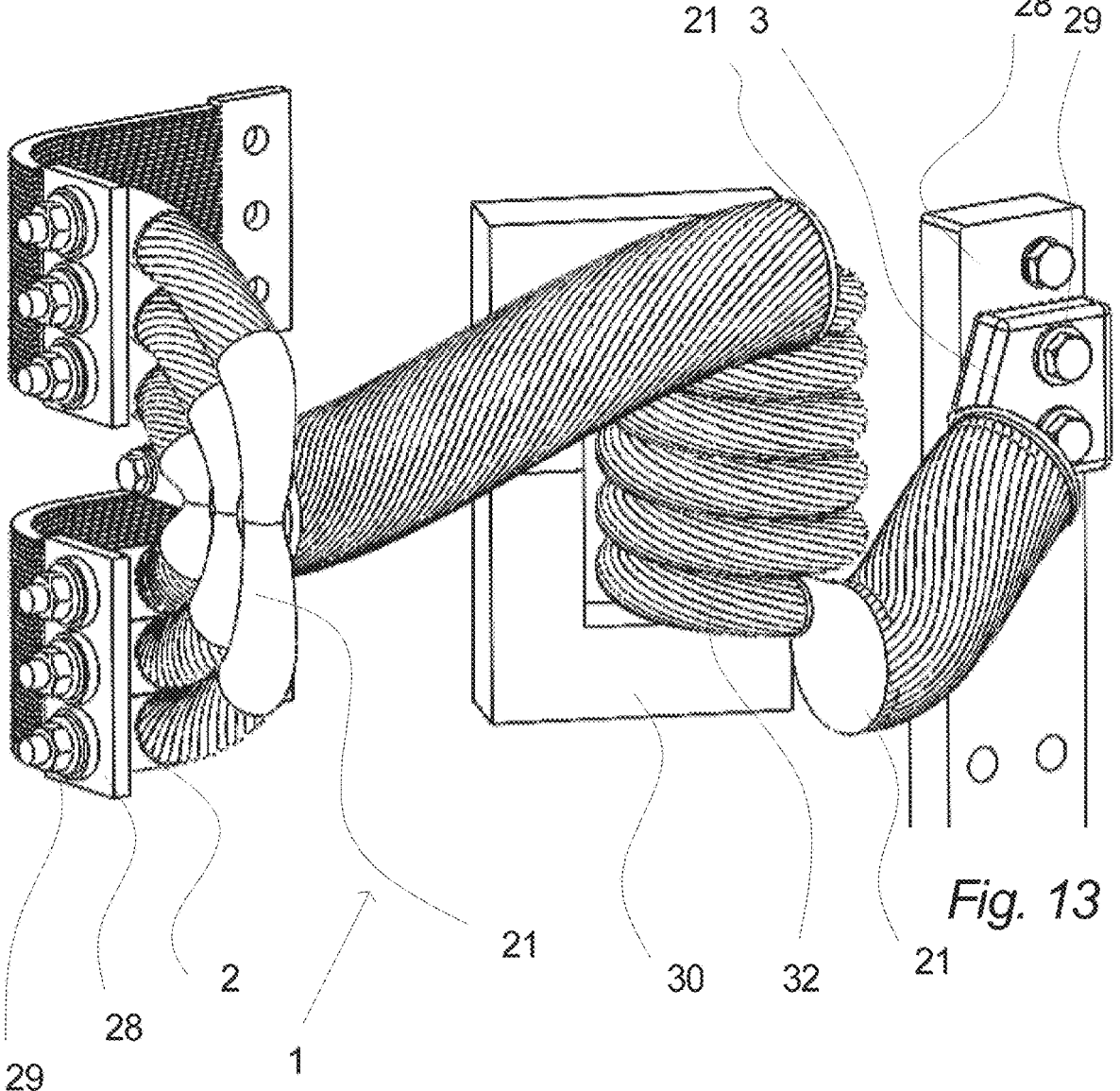

Various embodiments of the invention will in the following be described with reference to the drawings where:

FIGS. 1a-c illustrate an electrical conductor according to an embodiment of the invention, FIG. 2 illustrates a side view of an embodiment and how various measures may be quantified according to the invention, FIG. 3 illustrates method steps according to an embodiment of the invention, FIGS. 4a-d illustrate a side view and different cross-sectional views of an embodiment of the invention, FIGS. 5a-b illustrate embodiments with a cooling channel according to the invention, FIGS. 6a-c illustrate an embodiment with an inner bulk structure and an outer surface structure according to the invention, FIGS. 7a-b illustrate alternative embodiments of the invention, FIG. 8 illustrates another embodiment of the invention, FIG. 9 illustrates an electric conductor with cooling structure according to an embodiment of the invention, FIG. 10 illustrates an electric conductor with cooling structure and ferrite core according to an embodiment of the invention, FIG. 11 illustrates a twisted electric conductor design according to an embodiment of the invention, FIG. 12 illustrates a web electric conductor design according to an embodiment of the invention, and FIG. 13. illustrates an electric conductor in a twisted design with an inductor part according to an embodiment of the invention.

DETAILED DESCRIPTION

FIGS. 1a-c illustrate an electrical conductor 1 according to an embodiment of the invention. Particularly, FIG. 1a illustrates an angled view of the electrical conductor 1, FIG. 1b illustrates a front view of the electrical conductor 1, and FIG. 1c illustrates a side view of the electrical conductor 1c.

Each of FIG. 1a-c further shows axes indicating a lengthwise direction 9, a first transversal direction 8a, and a second transversal direction 8b.

The electrical conductor comprises a first end segment 2 and a second end segment 3, the second end segment being 3 distal to the first end segment 2. These two ends may for example be galvanically coupled to respective terminals of an electrical installation in a renewable energy facility, such that the electrical conductor can facility transfer of current and/or voltage.

The first and second end segments 2,3 are electrically and mechanically coupled by a middle segment 4. The middle segment 4 is formed by a plurality of conductor branches 5a-5d. This particular embodiment comprises a total of six conductor branches 5a-5d, distributed in a 2×3 two-dimensional array. Note that two of the conductor branches are hardly visible in FIG. 1*a*, since they are hidden behind other conductor branches 5*b*,5*c*.

Each of the conductor branches 5*a*-5*d* are monolithically united with at least the first end segment 2. This means that an end segment is built together with a conductor branch by changing layer dimensions so as to build the desired structure of the conductor branch, the end segment respectively and the transition therebetween. The first and middle segments 2,4 are monolithically united, since they are manufacturing from a single bulk piece of material, which was machined to provide the electrical conductor 1. Here bulk piece of material should be understood as the material of which the electrical conductor 1 is made.

The manufacturing of the electrical conductor 1 may be done by an additive manufacturing process. Such manufacturing process may be based on, but not limited to, one of the following additive manufacturing processes: 3D printing, layer by layer printing, Wire Arc Additive Manufacturing, Fused Deposition Modeling, Direct Energy Deposition, Direct Metal Deposition, Sintering based processes, laser based processes, etc. It should be mentioned that the actual additive manufacturing process used to print or build the electrical conductor for most types/geometry may not be important as long as the material of which the electrical conductor is build is an electrical conductive material.

In FIGS. 1*b* and 1*c* the conductor branches 5 are built from the end segment 2. The stipulated line serves to illustrate the perimeter of the end segment 2. In FIG. 2, the stipulated lines between end segments 2, 3 and conductor branches 5 could be deleted to illustrate the monolithically united nature of the electric conductor 1. However, the illustrate the corner radius 12 they are also included in FIG. 2. In FIG. 4*a*, the lines are deleted to illustrate the monolithically united nature of the conductor.

The conductor branches 5*a*-5*d* illustrated in FIG. 1*a*-1*c* may each be monolithically united with the first end segment via rounded connections. Each of these rounded connections shapes a concavely rounded interior corner 6 between the first end segment and a conductor branch.

In this particular embodiment, the rounded connections and the resulting concavely rounded interior corners 6 differ from the connection between the second end segment 3 and the conductor branches 5*a*-5*d*, which do not shape concavely rounded interior corners between the second end segment 3 and the conductor branches 5*a*-5*d* (see FIGS. 1*b* and 1*c*).

In another particular embodiment, the conductor branches 5*a*-5*d* are connected to both end segments 2, 3 without concavely rounded interior corners 6 (see e.g. FIG. 2).

Hence conductor branches 5*a*-5*d* may be connected to both end segments 2, 3 via concavely rounded interior corners 6, to one of the end segments 2, 3 via concavely rounded interior corners 6 or without concavely rounded corners 6.

The concavely rounded interior corners 6 may be established by successively increased or decreasing the size of one or more layers from one of the end segments 2, 3. Thereby gradually going from building an end segment to building a conductor branch.

The non-concavely rounded connections between an end segment and a conductor branch may be established by building a plurality of layers with the same geometry such as a square. Thereby "instantly" from the last layer of the end segment to the first layer of the conductor branch going from building an end segment to building a conductor branch.

It should be noted that the connections between end segment and conductor branch in principle always is substantially perpendicular when looking at the connection on a "layer level" (as perpendicular as one layer can be added to another layer). However, when referring to a connection in the content of this invention a reference is made to two or more successive layers i.e. a plurality of layers together forming the shape of the connection/transition between end segment and conductor branch.

Accordingly, the end segment, conductor branches 5*a*-5*d* and transition between end segment and conductor branch may have any given geometry possible to manufacture by additive manufacturing.

The geometry of rounded connections further spatially separate the conductor branches 5*a*-5*d* from each other. Particularly, the conductor branches 5*a*-5*d* are not only spatially separated in a single transversal direction. Instead, the conductor branches 5*a*-5*d* are both separated by a first spatial separation 7*a* in the first transversal direction 8*a* and separated by a second spatial separation 7*b* in the second transversal direction 8*b*. Such separation may also be established when designing the electric conductor and therefore such separation is also possible to obtain with perpendicular transition between end section and conductor branch.

Note that each of the individual conductor branches are not necessarily spatially separated in both transversal directions 8*a*,8*b* from the remaining conductor branches. For example, focusing on the conductor branch labelled "5*c*" in the embodiment illustrated in FIGS. 1*b* and 1*c*, this conductor branch is spatially separated in the first transversal direction 8*a* from the conducted branches labelled "5*a*" and "5*b*", but it is not spatially separated in the first transversal directions 8*a* from the conductor branch labelled "5*d*". Instead, the conductor branch labelled "5*c*" is spatially separated in the second transversal direction 8*b* from the conductor branch labelled "5*d*", but not spatially separated in the second transversal direction 8*b* from the conductor branches labelled "5*a*" and "5*b* ".

The middle segment 4 is formed by conductor branches 5*a*-5*d*, the embodiment thus provides electrical and mechanical coupling of the two end segments 2,3 via the conductor branches 5*a*-5*d*.

It should be noted that even though the conductor branches 5*a*-5*d* in FIG. 1*a*-1*c* are illustrated as more or less uniform conductors, the design/geometry may take any machinable/printable shape. Such shape may be optimized according to conducting current (skin effect), cooling including air guidance, etc.

The particular electrical conductor 1 of FIG. 1*a*-*c* may be made of copper, but could also be made of other electrically conductive materials such as aluminum, titanium, etc.

FIG. 2 illustrates a side view of an electric conductor according to an embodiment and how various measures may be quantified according to the invention.

In this particular view, three conductor branches 5*a*-5*c* are visible. Further, the embodiment may have additional branches which are not visible from this particular view, since the three visible conductor branches 5*a*-5*c* obstruct the view. In other words, from this particular view angle, additional conductor branches may be located behind the visible conductor branches 5*a*-5*c*.

The figure illustrates how a branch diameter 10 of a conductor branch 5*a* may be quantified. Particularly, even though a particular branch 5*a* has a highly non-uniform diameter (measured in a transversal direction) along the lengthwise direction, a well-defined branch diameter 10 may nevertheless be determined. Namely, the branch diameter 10 may be determined at a transversal plane at which that branch has its smallest diameter. In this particular figure, this plane corresponds to the approximate center (in the lengthwise direction) of the conductor branch 5a. If a diameter of the conductor branch 5a was measured away from this center, a larger diameter would be measured. Hence, the center is the location at which the branch diameter 10 is measured.

The figure further illustrates how a neighbor spacing 11 of two neighboring conductor branches 5a,5b may be quantified. As for the branch diameter, a non-uniform diameter of conductor branches may result in a non-uniform distance between two conductor branches 5a,5b. Nevertheless, a well-defined neighbor spacing 11 may be determined by measuring in the transversal plane in which the largest spatial separation between two given conductor branches is present. In this particular figure, the largest spatial separation is at the approximate center (in the lengthwise direction) of the neighboring conductor branches 5a,5b. If a distance between these two conductor branches was measured in a transversal plane away from this center, a smaller distance would be measured. Hence, the center is the location at which the neighbor spacing 11 is measured.

In this particular embodiment, the neighbor spacing 11 and the branch diameter 10 is measured in the same transversal plane. However, in other embodiments, due to the shape of conductor branches, the neighbor spacing and branch diameter is measured in different transversal planes (at different positions along the lengthwise direction).

The figure additionally illustrates how a corner radius 12 of a concavely rounded interior corner 6 may be quantified. The rounded connection between the first end segment 2 and a conductor branch 5b forms the interior corner 6, which may be characterized by this corner radius 12. The exemplary figure shows how the corner radius of this interior corner can be determined in the plane of the figure. The corner radius may vary between different planes. A first line 18a is drawn in the lengthwise direction in the plane of the figure as a tangent line to the point at which the branch diameter is measured (i.e., where the branch has its smallest diameter in the transversal direction). A second line 18b is drawn in the transversal direction in the plane of the figure where the middle segment 4 and the first end segment 2 are united. This line 18b may for example be a tangent line to the lengthwise air gap/spatial separation between the first end segment 2 and the second end segment 3. (The lengthwise spatial separation is a result of having a middle segment 4 formed by conductor branches 5a-5c.) A circle (or a part of a circle) having the first line 18a and the second line 18b as tangent lines may then be drawn. The radius of the largest possible circle for which the part of the circle between the two intersection points 24 with the first line 18a and second line 18b lies entirely within the interior corner 6 is then the corner radius 12.

In the exemplary embodiment of FIG. 2, the corner radius 12 is equal to 1.0 branch diameter 10. The ratio of neighbor spacing 11 of two neighboring conductor branches 5a,5b to a branch diameter 10 of one of these conductor branches 5a,5b is 2.0.

FIG. 3 illustrates method steps for machining an electric conductor according to an embodiment of the invention. The particular method relates to coupling two segments of an electrical conductor, namely a first end segment and a second end segment with conductor branches.

It should be mentioned that this may include printing both end segments and the conductor branches. Hence, the method may start by printing one end segment, then the transition to the conductors, then the conductors, then the transition to the second end segment and finally the second end segment.

Alternatively, the end segments may be separate elements that is connected via the middle section. The middle section may be printed and during the manufacturing of the middle section it may be attached to the end segments such as printed onto the end sections. The middle section may be joints to the end sections by means of welding, printing, soldering, etc.

It should be note, that the end segments may comprise terminals for connecting the finalized electric conductor to other electric parts/conductors of an electric system.

In a step S1 of this particular method, the first end segment and middle segment in the form of conductor branches of a plurality of conductor branches are monolithically united via individual transitions that may include rounded connections to shape concavely rounded interior corners between the first end segment and conductor branches of the plurality of conductor branches and to spatially separate conductor branches of said plurality of conductor branches.

The step of monolithically uniting the first end segment and conductor branches may be implemented using various methods, for example methods, such as additive manufacturing such as 3D printing, casting, and simply removing material, via machining, from a bulk metal slab to form conductor branches united with a first end segment.

In a step S2 of the method, the first end segment and the second end segment are electrically coupled and mechanically coupled via a middle segment of the electrical conductor formed by the plurality of conductor branches.

Middle segment may in principles have any design/geometry. It may be formed by conductor branches being solid or have internal cavities to reduce the amount of material that is needed to manufacture the electric conductor. It may be formed by a web or as a hybrid between conductor branches or web.

Internal cavities may be used as cooling channels and/or additional surface for conducting high frequency current. Accordingly, the end segments and middle segments may be designed for the particular panel/electric system in which it is used, for a particular type of current to conduct, for having a desired or dual functionality, etc.

One such functionality, beside the above-mentioned may be as a structural support. Hence, if needed the electric conductor may be designed to assist in carrying the weight of electric components connected thereto. Hence, its dimensions may be larger than what needed by it for carrying the required current. Similarly, its geometry may be designed of the combined purpose of mechanical support and electric conductance.

It should be mentioned that the electrical conductor 1 may be manufactured in two or more resolutions. In case of additive manufacturing resolution may be defined by thickness of the layers of which the electric conductor is build. A first resolution that is finer i.e. having thinner layer size than a second resolution may be used when manufacturing the interface between the electric conductor and the part to which it is connected. Such interface may be the part of the terminal that is in contact with the other part. Alternatively, resolution may be determined by material deposition rate, material flow rate, etc. depending on the type of additive manufacturing used.

To avoid electric losses in connections between two electric conductors it is important that the two parts are having planer surfaces. The finer these interfaces are manufactured the better/the less post manufacturing processing is needed to ensure sufficient planer surfaces. With this said, it should be noted that end segments of two electric conductors may be joints by means of engaging tooths, slider lock, tongue and groove, etc. This may lead to an easier assembly of electric conductors such as busbars in an electric system.

The second resolution manufactured e.g. with thicker layers would be more rough leading to more surface area. At least for middle and high frequency currents this may lead to conductance of more current without increasing the need for material/dimensions of the conductor. In fact, the middle segment may be manufactures intentionally with a corrugated surface to increase the current carrying outer surface of the electric conductor (current carrying with medium and high frequencies) because of more efficient cooling due to the turbulence of e.g. cooling air flow created due to the corrugated surface. It should be noted, that if the conductor includes an interior space, the inner surface of the conductors creating such interior space may also be corrugated for the same purpose. A corrugated surface has the effect, that it introduces turbulence in the flow of cooling fluid such as air. Increased speed of cooling fluid may lead to higher cooling effect.

As an example, the depth into the conductor which is used for conducting current at medium and high frequencies may in a specific embodiment be approximate 1.5 mm. In this specific example, the conductor is made of copper with a resistivity of approximate 1.68 $\mu\Omega$ cm, a relative permeability of approximate 1 at a frequency of 2 kHz. Thus, a conductor for this particular embodiment may be hollow having conductor thickness of 2 times 1.5 mm. In practice such conductor may be manufactured with a thickness 4-5 mm leaving room for a cooling in the interior or simple reduction of conductor material and thereby weight.

Knowing that skin effect also appears at e.g. 50 Hz, a reference to a medium frequency with respect to skin effect is a reference to frequency starting around 500 Hz where the design of the conductor may account for the skin effect. The medium frequency range may be between 500 Hz and 10 kHz, above 10 kHz may be referred to as high frequency where skin effect is a fact (the higher frequency, the closer to the surface the current will be conducted).

Further, it should be mentioned that the outer surface may also be corrugated or designed with fins for increasing heat dissipation from the electric conductor.

The electrical conductor resulting from the method may be used as an electrical conductor of an electrical installation. The electrical installation may be an electric panel which may be part of a renewable energy facility such as a wind turbine. However, note that manufacturing the electrical conductor, and thus accomplishing the electrical and mechanical coupling between the first end segment and the second end segment, is typically performed prior to installing the electrical conductor in the electrical installation, and prior to installing the electrical installation in the renewable energy facility. Thus, according to typical embodiments of the invention, the electrical and mechanical coupling is performed prior to installation/integration of the electrical conductor. Nevertheless, methods according to the invention are not necessarily restricted to a particular sequence of steps. Further, various methods according to the invention may comprise additional steps, such as performing digital geometry optimization, additively manufacturing the electrical conductor, and conducting current.

Summing up, a designer is designing a digital representation of the conductor according to electrical, mechanical, structural, etc. requirements in e.g. a 3D CAD software such as Solidworks. Files (digital representation) from such 3D developing tool is exported to e.g. a 3D printer, where the conductor is printed according to the CAD files.

FIGS. 4a-d illustrate a side view and different cross-sectional views of an electric conductor according to an embodiment of the invention. Namely, FIG. 4a illustrates a side view of an electrical conductor 1 according to an embodiment of the invention, with three transversal planes 15a-15c displayed as horizontal lines. FIGS. 4b-4d illustrate cross-sectional views of the electrical conductor 1 in these three respective transversal planes 15a-15c, where FIG. 4b illustrates a cross-sectional view in the uppermost transversal plane 15c, FIG. 4c illustrates a cross-sectional view in the middle transversal plane 15b, and FIG. 4d illustrates a cross-sectional view of the lowest transversal plane 15a.

The illustrated electrical conductor 1 has four conductor branches 5a-5d, of which only two of the conductor branches 5a-5b are visible in FIG. 4a. Each of the four conductor branches 5a-5d is a forking branch, in which a branch stem 13a-13d forks into two diverging branch twigs 14a-14h.

A given conductor branch 5a is monolithically united with the first end segment 2 in a single connection, which in this embodiment is rounded, from which the branch stem 13a of the conductor branch 5a protrudes. Along its extension in the lengthwise direction, away from the first end segment 2, the conductor branch 5a eventually forks into two branch twigs 14a,14b. This is clearly illustrated in FIGS. 4c-4d, in which a branch stem 13a of the conductor branch 5a in one transversal plane 15a has split into two branch twigs 14a, 14b in another transversal plane 15b. As a result, in this particular embodiment, a given conductor branch 5a has only one rounded connection with the first end segment 2, whereas it has several connections with the second end segment 3. Also, in this particular embodiment, the second end segment 3 and each of the branch twigs 14a-14h are monolithically united by rounded connections thus shaping concavely rounded interior corners between the second end segment 3 and the branch twigs 14a-14h.

FIGS. 4a-4d further illustrate how the cross-sectional area of the electrical conductor may be reduced in the middle segment 4. This is particularly apparent by comparison of FIG. 4b with any of FIG. 4c and FIG. 4d. FIG. 4b has the largest cross-sectional area. Further, the cross-sectional area actually varies across the middle segment 4. Here, this is evident in that the cross-sectional area in FIG. 4c is smaller than the cross-sectional area in FIG. 4d. Generally, a gradually changing cross-sectional area across parts of the middle segment may ensure that robustness of the electrical conductor, while minimizing the material required to manufacture the electrical conductor 1, which is advantageous.

Moreover, FIGS. 4a-4d illustrate how the perimeter length may vary in transversal planes 15a-15c at different positions in the lengthwise direction. The perimeter length of a given segment 2-4 may simply be measured as the sum of all lengths of perimeters of areas in a given transversal plane. In this embodiment, the perimeter length of the second end segment 3 is thus the length of the perimeter of the cross-section illustrated in FIG. 4b. And the perimeter length of the middle segment 4 is the sum of lengths of perimeters of all the individual branch twigs 14a-14h in FIG. 4c, or of all the individual branch stems 13a-13d in FIG. 4d. In case of multiple different possible perimeter lengths for the middle segment (as is the case here), the smallest perimeter length may preferably be used.

In the illustrated embodiment, a ratio of the perimeter length to the cross-sectional area is larger in the middle segment 4 than in any of the first and second end segments 2,3.

Generally, the cross-sectional areas, perimeter lengths, and their ratios are a measure of how much material is removed from the middle segment (in comparison with a busbar with a more uniform design).

It should be noted that the electrical conductors illustrated e.g. in FIG. 2-4 comprises uniform conductor branches 5. However, it should be noted that in alternative embodiments, the conductor branches 5 of one electrical conductor 1 may all have a different geometry so that only two or no branch diameters are the same and only to or no neighbor spacing 11 are the same. Also, it should be noted that the middle segment i.e. the conductor branches alternatively may be manufactured as a uniform web-like structure with uniform perimeter length across conductor branches of such web-like structure. An example of a web-like structure could be a honeycomb structure FIGS. 5a-b illustrate embodiments of the electric conductor 1 with a cooling channel 16 according to the invention. Each of the two embodiments are illustrated via cross-sectional views in a plane spanned by a lengthwise axis and a transversal axis.

In FIG. 5a, both the first end segment 2 and the second end segment 3 has a channel opening 17, which permits cooling fluid, such as water or air, to flow through the cooling channel 16. The cooling channel itself passes through one of the conductor branches 5b of the electrical conductor 1. This conductor branch is then particularly efficiently cooled. With respect to cooling it should also be noted that the spacing between two adjacent conductor branches may also be used to cool the electrical conductor e.g. by providing an air flow through these spacings.

Even though the conductor branch 5b with the cooling channel 16 may be able to facilitate most of the current power transfer of the electrical conductor 1, the other branches 5a,5c advantageously provide mechanical support, such that the electrical conductor is not deformed during use under conditions with stress and/or vibrations.

Such structural support and cooling considerations may lead to a design of an electrical conductor having conductor branches with different geometry. In fact, the electric conductor may be manufactured with a structural support branch which is electric isolated and only has the function of structural support and no electric conductance support. Such stem or twig may at the same time as function as structural support also serve as a heat dissipation part.

Conductor branches 5a,5c without an internal cooling channel may have a relative surface area which ensures that these branches are cooled sufficiently without having an internal cooling channel. Or, alternatively, the thermal conductivity of the electrical conductor may ensure that the cooling provided by a cooling channel passing through a subset of the conductor branches is sufficient to ensure that all parts of the electrical conductor is cooled.

In FIG. 5b, both the first end segment 2 and the second end segment 3 have a channel opening 17, as in FIG. 5a. However, the route of the cooling channel 16 is different in FIG. 5b. It does not just pass through a single conductor branch, but several conductor branches 5a-5c. Consequently, a single cooling channel 16 is capable of providing cooling to several conductor branches, which is advantageous. Further, cooling may be more evenly distributed across the electrical conductor, e.g. more evenly distributed among the first end segment 2 and the second end segment which is advantageous. Even cooling distribution among end segments 2,3 may advantageous be enhanced since the cooling channel may alternately enter and exit the end segments 2,3.

It should be mentioned that not illustrated cooling systems may be connected to the channel openings 17 at the end segments. These connections may e.g. include a threaded part, recess for a nut or other fitting which may also be monolithically united with the end segments i.e. be manufactured as part of/in one with the end segment.

In other embodiments, a single cooling channel traverse the middle segment via conductor branches an even number of times, such that both channel openings of a cooling channel may be located in the same end segment of the first and the second end segments. This may ensure easier coupling of fluid couplings to the channel openings 17, for example if the two channel openings are placed right next to each other on the same segment. This is particularly relevant when employing a cooling liquid, such as water (as opposed to, e.g., air). Further relevant, when employing liquid cooling, is having an isolation layer of the internal cooling channel, which galvanically isolates the interior of the cooling channel from the bulk of the electrical conductor.

In FIG. 5b, with stipulated lines are illustrated air guiding fins 25 for guiding part of the air flow 26 into the cooling channel 16. The air guiding fins 25 may be established by additive manufacturing as the rest of the conductor 1 and designed to guide exactly the needed part of the air flow 26 into the cooling channel 16.

Note that embodiments of the invention are not restricted to cooling via one or more internal cooling channels. Other viable sources of cooling are attachment of a heat sink (e.g. one or more heat sinks monolithically united with one or more segments of the electrical conductor see FIG. 9 and the description below), thermal dissipation via attachment of the end segments to electrical terminals, and cooling via external air flow.

Note further that embodiments may comprise several cooling channels, and that a cooling channel may fork into several diverging cooling sub-channels. For example, a single cooling channel in the first end segment may fork into several cooling sub-channels which pass through different respective conductor branches and merge together to a single cooling channel again in one of the end segments.

Further, in some embodiments of the invention, one or more internal cooling channels each comprises a galvanically isolating isolation layer. Any electrically isolating material may be used, thus forming a barrier between the current-carrying parts of the electrical conductor, and any liquids in internal cooling channels.

FIGS. 6a-c illustrate an embodiment with an inner bulk structure 19 and an outer surface structure 20 according to the invention. Namely, FIG. 6a illustrates a cross-sectional side view of an electrical conductor 1 according to an embodiment of the invention, with a transversal plane 15 displayed as a horizontal line. FIG. 6b illustrates a cross-sectional view of the electrical conductor 1 in this transversal plane, which particularly highlights the individual conductor branches 5a-5f of the embodiment. And FIG. 6c illustrates an angled view of a part of an electrical conductor (e.g. a part of a conductor branch).

The materials of the inner bulk structure 19 and the outer surface structure 20 are different. In this particular embodiment, the outer surface structure primarily comprises copper, whereas the inner bulk structure primarily comprises aluminum. Accordingly, the surface of the electrical conductor 1, in which AC current primarily is conducted due to the skin effect, has a relatively high conductance, while significantly reducing the amount of copper required in comparison electrical conductors of a similar comprising primarily copper throughout the bulk of the electrical conductor.

Note that the inner bulk structure 19, by itself, has two end segments and a middle segment formed by a plurality of conductor branches coupling the end segments, wherein the conductor branches are monolithically united by rounded connections thus shaping concavely rounded interior corners and spatially separating conductor branches in different transversal directions. And moreover, the outer surface structure 20, by itself, has two end segments and a middle segment formed by a plurality of conductor branches coupling the end segments, wherein the conductor branches are monolithically united by rounded connections thus shaping concavely rounded interior corners and spatially separating conductor branches in different transversal directions. In other embodiments, only one of the two structures 19,20 may have such properties.

FIG. 6c illustrates an angled view of a part of an electrical conductor, such as a part of a conductor branch. In principle, such a part as illustrated may also be used by itself. That is, the part illustrated in FIG. 6c can in principle in itself used as an electrical conductor without necessarily being monolithically united with an end segment. Such an electrical conductor without a plurality of branches may nevertheless have one or more of the advantages of the disclosure. Particularly, since the materials of the inner bulk structure 19 and the outer surface structure 20 are different, a relatively high AC conductance is achieved while additionally having the advantages of the material of the inner bulk structure, such as price, weight, manufacturing, and vibrational properties, and structural properties (e.g. elasticity/stiffness, plasticity etc.).

FIGS. 7a-b illustrate alternative embodiments of the invention. Particularly, FIG. 7a illustrates an embodiment with several middle segments 4a,4b, in which each of the middle segments is formed by a plurality of conductor branches 5. And FIG. 7b illustrates an embodiment in which the electrical conductor 1 is angled.

In FIG. 7a, the electrical conductor 1 comprises a first end segment 2 directly coupled to a first middle segment 4a. Similarly, the electrical conductor comprises a second end segment 3 which is directly coupled a second middle segment 4b. Each of these two middle segments 4a,4b is then directly coupled to a central body segment 21. Thus, the first end segment 2 and the second end segment 3 are electrically coupled and mechanically coupled via the first middle segment 4a, the central body segment 21, and the second middle segment 4b.

Particularly, several middle segments formed by a plurality of conductor branches may facilitate and potentially further improve any of the advantages which a single middle segment would otherwise provide. Further, several middle segments may permit additional designs of electrical conductors. For example, certain constraints (e.g. spatial constraints) may limit the permitted spatial extend of a single middle segment. Thus, having several middle segments may enable electrical conductors with advantageous properties to be implemented in situations and configurations in which they could otherwise not be utilized.

In FIG. 7b, the electrical conductor 7b comprises a first end segment 2 and a second end segment 3 coupled by a middle segment 4. In this particular embodiment, the first end segment is angled. The plurality of conductor branches 5 and the direction in which they couple the end segments determine a lengthwise direction of the electrical conductor 1. The bending/angling of the first end segment 2 permits the electrical conductor 1 to deviate from this lengthwise direction. This may in turn permit alternative structural designs of the electrical conductor 1 and improve possibilities of connecting the electrical conductor 1 within an electrical installation. In some embodiments, both the end segments 2,3 comprises one and/or more bends/angles. In some embodiments, the middle segment comprises a bend/angle, while electrically and mechanically coupling the first end segment and the second end segment in a lengthwise direction.

FIG. 8 illustrates another embodiment of the invention. In comparison with other embodiments illustrated in this disclosure, conductor branches of the electric conductor of this particular embodiment has a generally rounded design.

As for other embodiments, the middle segment 4 is formed by a plurality of conductor branches 5. In the illustration, the conductor branches 5 in the front obstruct the view to other conductor branches. Many of the conductor branches 5 connect to each other, for example via conductor branches forking into two diverging conductor branches, which in turn unite with other conductor branches, or via a transversal branch outgrowth 22, which couple two otherwise spatially separated conductor branches.

In addition, each of the first and second end segments 2,3 comprises fastener holes 23 (also referred to as terminals), which permit fastening the end segments 2,3 of the electrical conductor to different terminals in an electrical installation.

The embodiment of the invention illustrated in FIG. 9 is an electric conductor 1 to which cooling structures 27 are attached. The electric conductor 1 may be manufactured according to the additive manufacturing process describe above or be a standard conductor such as a solid cobber conductor. The conductor 1 may comprise a first end segment 2 comprising fastening holes 23 and a second end segment 3 configured for being connected to another conductor or simply extend further for other electric components to be connected to the illustrated conductor 1.

If used in the middle to high frequency domain, it may be advantageous e.g. to 3D print the conductor in that due to the skin effect described above only the outer part of the conductor may be used for conducting current.

The cooling structures 27 may either be attached to a standard conductor by additive manufacturing or it may be monolithically united with the conductor during manufacturing.

Cooling structures 27 and the conductor 1 may, if manufactured by additive manufacturing, utilize free space e.g. in an electric panel. Hence, the cooling structures 27 may be designed/manufactured so that they "reach out" into e.g. an air flow established by a ventilator of the electric panel.

The illustrated cooling structure 27 is illustrated as a cooling web which may guide air flow into the interior of the conductor 1 where cooling channels (not illustrated) may be made during manufacturing. The end segment 3 may be connected to another conductor 1 and the cooling channels may continue from the illustrated conductor 1 to the next.

The electric conductor 1 illustrated in FIG. 10 is similar to the one illustrated in FIG. 9. Visible is the two end segments 2, 3 and the cooling structure. An additional electric component such as a flexible busbar 28 is connected to the first end section 2 by nuts and bolts 29.

A plurality of ferrite cores 30 are illustrated between the cooling structure 27 they may comprise a first connectable to second part and thereby surround the middle part of the electric conductor 1. In this way electric noise from the conductor 1 may be reduced or eliminated.

Is it noted that the cooling structures 27 extends further than the ferrite cores 30 i.e. the cooling structures 27 are in direct contact with a possible flow of cold air and thereby heat dissipation from the electric conductor 1 is still possible even though it is wrapped in ferrite cores.

Further, the distance between the cooling structures 27 may be determined by the thickness of the ferrite cores so as to assist in positioning the ferrite cores 30 at a desired location on the conductor 1. This is true both during transportation and operation in vibrating environment.

The embodiment of the invention illustrated in FIG. 11 is also an electric conductor 1. This embodiment also comprises two end segments 2, 3 each with one fastener hole 23 and a middle section 4. In this particular embodiment the electric conductor is optimized according to outer surface of the conductor. This is easy to observe due to the plurality of conductor branches 5 connecting the two end segments 2, 3.

In this particular embodiment, the plurality of conductor branches 5 are divided in three sets. In other embodiments the conductor may comprise additional sets such as 5, 7 9 or even more sets of twisted sets. In these three sets the conductor branches are twisted and the three sets of twisted conductor branches 5 are also twisted. All individual conductor branches are connected to the end segments 2, 3. This may be done via rounded corners or perpendicular connections between the conductor branch 5 and the end segment 2, 3. The illustrated design may have the advantage that it facilitates a linear current path which may lead to a reduced resistance. This design is inspired from litz wires to achieve the advantages of this wire type.

The illustrated conductor 1 is manufactured from additive manufacturing and thereby it is possible to ensure a distance between each of the individual conductor branches 5. This type of electric conductor is inspired by the advantages of a so-called Liz wire. Since it can be manufactured e.g. by 3D printing it can be shaped in any form utilizing free space e.g. in an electric panel.

A twisted conductor design as the one illustrated in FIGS. 11 and 13 is advantageous in that it has the effect, that it adds flexibility to the electric system. Hence, the accuracy of the holes/terminals of the electric conductor and additional electric components to which it is to be connected may be allowed to be less accurate. This is because by pulling or pushing the terminal/holes may move and thereby fit to the other component. Further, tension or forces acting on the additional electric component may be reduced in that the twisted design allows for obtaining tolerances both in the longitudinal direction, sideways, and axial. This is true both in terms of forces introduced by vibrations but also static forces e.g. occurring by forcing an electric conductor to a position where it is possible to mount to an additional electric component.

Both for this and other embodiment of the invention presented in this document it should be mentioned that if electric insulation is required for the electric conductor 1, the electric conductor 1 may be dipped into a bath of liquid like insulating material. In this way all outer surfaces of both the middle segment and end segments may be electrically insulated.

The conductor branches of the conductor 1 illustrated in FIG. 12 is manufactures as a web like structure 31. Hence, there are no conductor branch as such by a web or structure in which the current can be conducted through the conductor 1.

Such design has the advantage that it has a large surface compared to a standard known conductor. This large surface is especially advantageous in medium to high frequency applications. Further, with respect to cooling a web-like structure is advantageous in that air can pass through the conductor and cool the large areas efficiently.

The obvious fact, that less material is used is advantageous in that material costs are reduced but also weight. A reduction in weight leads to a reduction in brackets needed to fix the conductor 1 to ensure safe operation also in environment where the conductor/panel in which it is mounted is exposed to vibrations. Also, the lower weight the cheaper transport expensed is expected.

The illustrated compact conductor is advantageous due to its compact design, but also in that it can be designed as needed. Hence, if another conductor needs to passe through the illustrated conductor. The illustrated conductor may be designed and subsequently manufactured with a free space through which the other conductor may pass through.

It should be mentioned that end sections 2, 3 comprising terminals 23 of a web like structured conductor 1 may also be at least partly manufactured in a web like design. Thus, the transition between longitudinal direction of the middle segment and the end segments is more or less erased.

However, the part of the end segments 2, 3 should comprise a solid part, at least if nuts and bolt are used to connect the conductor 1 to an additional electric component. The end segments may be completely of a web like design e.g. if connection to additional electric components are made by twist and turn or other quick lock principles.

The terminal parts of the end segments 2, 3 in the embodiment illustrated in FIG. 12 comprises a solid abutment plate (see first end segment) against which an additional electric component can be connected. On the other side of the end segment (see second end segment) around the hole for the connecting bolt the end segment comprises a solid part which extend through the end segment to ensure sufficient strength when using nuts and bolts to fasten the conductor 1 to an additional electric component.

The embodiment illustrated in FIG. 13 could be said to be a combination of several of the above illustrated/described embodiments. The conductor 1 illustrated on FIG. 13 is of the twisted type illustrated in FIG. 11. It has three central body segments 21 one is separating one larger twisted conductor part into six twisted conductor parts individually having a smaller diameter than the larger twisted conductor. The other two are connecting the first and a second larger twisted conductor part with the inductor part 32. The six twisted conductor parts each terminates in a first end segment 2. These six first end segments 2 are connected to an additional electric component 28 via a nut and bolt 29 connection. The second end segment 3 is also connected to an additional electric component 28 via a nut and bolt 29 connection.

As illustrated the conductor 1 comprises an inductor part 32 with five windings. Through each of these windings one ferrite core 30 extend leading to substantially the same noise reduction as the embodiment illustrated in FIG. 10. Hence, by the illustrated conductor 1 design, four ferrite cores are avoided without compromising the noise reduction.

The embodiment illustrated in FIG. 13 is one example of an electric conductor having different dimensions i.e. a thick part connected to the second end segment 3 and to a thinner inductor part 32 which again is connected to a thick part. This way of designing the electric conductor is advantageous in that it has the effect, that the thinner part (inductor part 32 on FIG. 13) of the electric conductor may be coiled around a core. The core may be a ferrite core as illustrated, but may also be e.g. a core of a transformer or the electric conductor may be coiled to form a reactor.

By manufacturing the electric conductor with a thinner part and using this thinner part to coil instead of coiling the thicker part, is leading to a reduction of the size of the ferrite core, transformer core, reactor or the like. This is because the window in e.g. the ferrite core need to by larger if the thicker part is coiled and need to go through the coil compared to a coiled part of the thinner part. The core may be smaller, more compact and thereby weight is reduced, hence, cost of and footprint in the electric system are saved.

Reducing the diameter of course comes with the disadvantage that the thinner part is becoming warmer than the thicker part in that the same current are running through the two parts. However, the electric conductor may be designed so that it is just before the coiled part starts, the diameter is reduced and just after the coiled part ends, the diameter is reshaped back to the thicker diameter again (as illustrated in FIG. 13). In such design heat may be dissipated from the coiled/inductor part (thinner part) towards and into the thicker part. Further, the coiled part is small so this part having higher resistance than the remaining part of the conductor is which will reduce the heat generations. Further, the design illustrated where it may be possible to circulate air through the twisted conductor branches, may facilitate better cooling.

In the following, various embodiments of the invention are described.

In embodiments of the invention, said plurality of conductor branches electrically couples and mechanically couples said first end segment and said second end segment in a lengthwise direction of said electrical conductor, wherein said different transversal directions are substantially perpendicular to said lengthwise direction.

Thus, the conductor branches may determine/define the lengthwise direction, and in turn, the transversal directions may be determined based on this lengthwise direction.

In embodiments of the invention, said two different transversal directions are a first transversal direction and a second transversal direction, wherein both said first transversal direction and said second transversal direction are substantially perpendicular to said lengthwise direction, wherein said first transversal direction and said second transversal direction are substantially perpendicular.

In embodiments of the invention, conductor branches of said plurality of conductor branches are distributed in both of said two different transversal directions.

In other words, all of the conductor branches are not just distributed within a (transversal) linear row of columns but are distributed in both transversal directions of a transversal plane spanned by the two different transversal directions.

Such a distribution may ensure reduced risk of structural damage during exposure to vibrations in both the transversal directions, which is advantageous.

In embodiments of the invention, conductor branches of said plurality of conductor branches are distributed differently in said two different transversal directions along said lengthwise direction.

For example, in different parallel transversal planes spanned by the two different transversal directions but which have different positions along the lengthwise direction, the distribution of conductor branches may be different along these different planes.

Such varying distributions may also be characterized as an organic or bionic branch structure.

Such a structure may ensure reduced risk of structural damage during exposure to vibrations in both the transversal directions, which is advantageous.

More specifically, conductor branches distributed differently along said lengthwise direction may be understood as conductor branches having different positions, different numbers of conductors (e.g., due to branch twigs), different cross-sectional sizes, different shapes, or any combination thereof.

In embodiments of the invention, concavely rounded interior corners of two neighboring conductor branches of said conductor branches are located between said two neighboring conductor branches.

In embodiments of the invention, said concavely rounded corners located between said two neighboring conductor branches form an arch structure between said two neighboring conductor branches.

By having concavely rounded interior corners between neighboring conductor branches, for example forming an arch structure, the stress concentration in this region may be reduced, which is advantageous.

In embodiments of the invention, said internal cooling channel fluidly couples said first end segment and said second end segment.

In embodiments of the invention, said internal cooling channel serially passes through several conductor branches of said plurality of conductor branches.

By passing a cooling channel through several conductor branches serially, each of these conductor branches may be cooled without having to introduce new fluid couplings to the electrical conductor, which is advantageous.

In embodiments of the invention, said internal cooling channel comprises a galvanically isolating isolation layer.

An isolation layer is useful when using liquid cooling, such as water cooling. The isolation layer may galvanically isolate the inner enclosure of the cooling channel from the rest of the electrical conductor. It may thus restrict voltage/current to pass from the bulk of the electrical conductor into liquid passing through the cooling channel.

In embodiments of the invention, a conductor branch of said plurality of conductor branches is a forking branch, in which a branch stem forks into at least two diverging branch twigs.

In embodiments of the invention, said transversal branch outgrowth is spatially separated in said lengthwise direction from said first end segment and said second end segment.

By having one or more forking branches and/or transversal branch outgrowths, facilitation of vibrational damping may be improved while reducing the required amount of material required to do so, which is advantageous. Further, such features may reduce shear, bending, and torsion deformation, which is advantageous.

In embodiments of the invention, said electrical conductor comprises one or more internal spatial voids.

A spatial void within the electrical conductor may reduce the amount of material required. It may simultaneously or alternatively reduce the skin effect, since the counter-electromotive force may be reduced, which is advantageous.

In embodiments of the invention, said first middle segment and said second middle segment are mechanically coupled and electrically coupled by a central body segment.

A central body segment may optionally include fastening holes or fixpoints to which the electrical conductor can be electrically and/or mechanically coupled to other components. This may for example permit the weight of the electrical conductor to be supported partially or primarily through other points than its connections to electrical terminals, which is advantageous. Further, a central body segment may facilitate attachment of measurement apparatus, such as a current probe.

In embodiments of the invention, said first end segment has a first end cross-sectional area, said second end segment has a second end cross-sectional area, and said middle segment has a middle cross-sectional area, wherein said middle cross-sectional area is smaller than any of said first cross-sectional area and said second cross-sectional area.

In embodiments of the invention, a ratio of said middle cross-sectional area to any of said first cross-sectional area and said second cross-sectional area is less than 1, for example less than 0.8, for example less than 0.6, for example less than 0.4, such as less than 0.3.

The concept of relative cross-sectional areas is one way to quantify the special topology and geometry provided by embodiments of the invention. Generally, a relative reduction of the middle cross-sectional area is associated with a reduction of volume, and thereby mass, of the electrical conductor, which is advantageous.

In embodiments of the invention, a branch diameter of a conductor branch of said plurality of conductor branches is at least 0.1 cm, for example at least 0.2 cm, for example at least 0.3 cm, for example at least 0.5 cm, such as at least 0.8 cm.

In embodiments of the invention, said plurality of conductor branches comprises at least 4 conductor branches, for example at least 6 conductor branches, for example at least 8 conductor branches, such as at least 10 conductor branches.

Such exemplary numbers of conductor branches may advantageously provide the necessary mechanical and electrical properties required, which is advantageous.

In embodiments with forking branches and/or transversal branch outgrowths, the number of branches may be quantified as the number of connections between the first end segment and the plurality of conductor branches.

In embodiments of the invention, two neighboring conductor branches of said plurality of conductor branches are spatially separated by a neighbor spacing of at least 0.3 cm in one of said different transversal directions, for example at least 0.5 cm, for example at least 0.7 cm, for example at least 1 cm, such as at least 1.5 cm.

Non-uniform thickness of branches, e.g., due to rounded connections, may result in a varying distance between conductor branches along different points in a lengthwise direction. The distance between neighboring conductor branches may be quantified by measuring at their largest spatial separation in a transversal direction.

Two neighboring conductor branches may for example be understood as any two conductor branches which are spatially separated by a distance which is smaller than any other spatial separation between one of these two neighboring conductor branches and any of the remaining conductor branches.

In embodiments of the invention, a ratio of neighbor spacing of two neighboring conductor branches of said plurality of conductor branches to a branch diameter of one of said two neighboring conductor branches is at least 0.5, for example at least 1, such as at least 1.5.

Such exemplary spatial separations may advantageously improve heat dissipation or reduction of material, which is advantageous.

In embodiments of the invention, said first end segment has a first end perimeter length, said second end segment has a second end perimeter length, and said middle segment has a middle perimeter length, wherein a ratio of said middle perimeter length to said middle cross-sectional area is relatively larger than any of a ratio of said first end perimeter length to said first end cross-sectional area and a ratio of said second end perimeter length to said second end cross-sectional area by a factor of at least 1.5, for example at least 2, for example at least 2.5, for example at least 3, for example at least 4, such as at least 5.

A relative ratio of a middle perimeter length to a middle cross-sectional area may be one way to quantify the special geometry of embodiments of the invention. Generally, a ratio of the perimeter length the cross-sectional area being larger is the middle section is a measure indicating a reduction of material.

In embodiments of the invention, a total weight of said electrical conductor is less than 200 kilograms, for example less than 150 kilograms, for example less than 120 kilograms, for example less than 100 kilograms, such as less than 80 kilograms.

In embodiments of the invention, a total weight of said electrical conductor is at least 1 kg, for example at least 2 kg, for example at least 5 kg, for example at least kg, for example at least 30 kg, such as at least 100 kg.

Employing the principles of the invention is particularly advantageous for heavy electrical conductors, since here, more material may be saved, and heat dissipation may be more challenging. Further, heavy conductors according to conventional principles may potentially obstruct access to substantial amounts of other equipment, which may potentially be solved by spatial separation between conductor branches according to the invention.

In embodiments of the invention, perimeters of conductor branches of said plurality of conductor branches are each substantially circular shaped in a plane spanned by said different transversal directions.

A circular shape of conductor branches may ensure that these conductor branches have no structural weakness in a particular transversal direction, which is advantageous.

In embodiments of the invention, a stress concentration factor at the rounded connection of a conductor branch of said plurality of conductor branches is less than 5, for example less than 4, for example less than 3, for example less than 2, such as less than 1.5.

A stress concentration factor is a quantification of the stress concentration.

The stress concentration factor $K_t$ may be defined as the ratio of the highest stress $S_{max}$ to a nominal stress $S_{nom}$ as $K_t = S_{max}/S_{nom}$.

For an infinitely sharp corner, the stress concentration factor is in theory infinite. By having rounded connections shaping rounded interior corners, the stress concentration factor may be reduced accordingly, such that a stress concentration factor at a rounded connection of a conductor branch is, e.g., less than 5.

In some embodiments, several rounded connections of several conductor branches have a stress concentration factor which is less than 5, for example less than 4, for example less than 3, for example less than 2, such as less than 1.5.

In embodiments of the invention, said relative motion between said first end segment and said second end segment is associated with any of said different transversal directions In embodiments of the invention, said relative motion between said first end segment and said second end segment is associated with said lengthwise direction.

In embodiments of the invention, said resonance vibration frequency is associated with a vibration damping, wherein said resonance vibration frequency damping is at least 0.001, for example at least 0.01, for example at least 0.03, such as at least 0.05.

Having a particular resonance vibration frequency may ensure certain damping properties to the electrical conductor, which may be advantageous. Particularly, vibrations at higher frequencies than the resonance frequency are typically damped significantly. Further, ensuring that the resonance vibration frequency has a particular minimal vibration damping may be advantageous to ensure robustness against vibrations in the tower.

The blade rotor of a wind turbine typically has a rotational period of several seconds. However, the gearbox of a wind turbine may have a gear ratio of 100:1, or even more, which expands the relevant frequency regime. Thus, having a resonance vibration frequency below this relevant frequency regime may ensure damping of vibrations. Alternatively, the resonance vibration frequency may be designed to lie far above the relevant frequency regime, ensuring that no destructive resonating vibrations occur.

The resonance vibration damping may also be understood by considering the electrical conductor as a driven damped simple harmonical oscillator and may alternatively be referred to as the damping ratio.

In embodiments of the invention, said electrical conductor has a current-carrying capability of at least 0.1 kiloampere, for example at least 0.3 kiloampere, for example at least 1.0 kiloampere, such as at least 3 kiloampere.

Having a current-carrying capability may ensure that the electrical conductor is capable of performing its required task. Particularly, embodiments of the invention may permit using less material or having a reduced cross-sectional area while still having a large current-carrying capability, which is advantageous.

Optionally, an upper limit of the current-carrying capability is below at most 100 kiloampere, for example at most 80 kiloampere, for example at most 50 kiloampere.

In embodiments of the invention, a conductance of said outer support structure is larger than a conductance of said inner bulk structure.

In embodiments of the invention, a mass density of said outer support structure is larger than a mass density of said inner bulk structure.

Having structures of the electrical conductor having different material compositions may advantageously permit reducing price and weight of the electrical conductor, which is advantageous.

For example, the outer surface structure may be formed by a material with a high conductance such as copper, while the inner bulk structure is formed by a material with a relatively small mass density, such as aluminum or tin. Since AC current may primarily run at the surface due to the skin effect, replacing interior part with a light-weight material may reduce weight and price while maintaining structural strength and without reducing the AC conductance severely, which is advantageous.

In embodiments of the invention, a total surface area of said middle segment is primarily formed by said outer surface structure In embodiments of the invention, said different material compositions are different metal compositions, such as different metals.

Alternatively, different material compositions may be different polymers/resins.

In embodiments of the invention, a material of said outer surface structure is copper, silver, or gold.

In embodiments of the invention, a material of said inner bulk structure is aluminum or tin.

In embodiments of the invention, said electrical conductor is a busbar.

In embodiments of the invention, each conductor branch of said plurality of conductor branches are solid.

In typical embodiments of the invention, conductor branches of the plurality of conductor branches are solid, as opposed to being formed by stranded wires, and as opposed to being formed by foiled/layered/sheeted/plated/laminated conductors.

In embodiments of the invention, said electrical conductor is non-isolated.

In embodiments of the invention, at least one material of said electrical conductor is at least one metal.

In embodiments of the invention, said at least one metal comprises any of copper, tin, aluminum, iron, silver, titanium and gold.

Note further that the conductor may be based on one or more alloys such as brass of steel. Also note that the conductor may be based on electrically conductive polymers, for example printable polymers, such as a material based on a carbon-filled resin.

In embodiments of the invention, two electric conductors are joint by means of engaging tooths, slider lock, tongue and groove, etc. This may lead to an easier assembly of electric conductors such as busbars in an electric system especially corner joins of busbars. Such joint may also be stronger In the following various embodiments of a method for coupling a first end segment of an electrical conductor to a second end segment of said electrical conductor within an electrical installation are described.

In embodiments of the invention, said electrical conductor is based on said digital representation of said electrical conductor.

In embodiments of the invention, said digital geometry optimization comprises topology optimization.

In embodiments of the invention, said digital geometry optimization comprises shape optimization.

In embodiments of the invention, said digital geometry optimization comprises a generative design process.

By employing digital geometry optimization, an electrical conductor may generally be improved. Particularly, material may be saved while taking into account structural and vibrational properties of the electrical conductor, which is advantageous.

In embodiments of the invention, said digital geometry optimization is based on one or more optimization criteria.

In embodiments of the invention, said one or more optimization criteria comprises size constraints of said electrical conductor.

Size constraints may advantageously ensure that the electrical conductor fits into the physical location in which it is supposed to fit.

In embodiments of the invention, said one or more optimization criteria comprises a surface area of said electrical conductor.

Optimization criteria relating to surface area may for example relate to maximizing surface area of said electrical conductor, particularly maximizing surface area of conductor branches, e.g. to improve air cooling, which is advantageous.

In embodiments of the invention, said one or more optimization criteria comprises a volume of said electrical conductor.

Optimization criteria relating to volume may for example relate to minimizing area of said electrical conductor, particularly maximizing surface area of conductor branches, e.g. to improve air cooling, which is advantageous.

In embodiments of the invention, said one or more optimization criteria comprises a ratio of said surface area to said volume of said electrical conductor.

Maximizing the ratio between the surface area and the volume may ensure minimal usage of material while ensuring sufficient cooling, which is advantageous.

In embodiments of the invention, said one or more optimization criteria comprises a resonance vibration frequency associated with a relative motion between said first end segment and said second end segment.

Including a resonance vibration frequency may ensure that this resonance vibration frequency is suitably located (in frequency space), which is advantageous.

In embodiments of the invention, said one or more optimization criteria comprises a vibration damping associated with said resonance vibration frequency.

A vibration damping may for example be a minimal vibration damping associated with the resonance vibration frequency. This may reduce the risk of destructive resonating vibrations of the electrical conductor, which is advantageous.

In embodiments of the invention, said one or more optimization criteria comprises current-carrying capabilities of said electrical conductor.

Current carrying capabilities may for example be a minimum power, e.g., a minimum AC power, which the electrical conductor is capable of conducting from the first to the second end segment without hazard. Such a minimum power may be further via a ratio of the minimum cross-sectional area of the electrical conductor to the (AC) power, e.g. 300 square millimeters per megawatt. For example, if the electrical conductor should carry 2 megawatt, is should have a minimum cross-sectional area of minimally 600 square millimeters.

In embodiments of the invention, said one or more optimization criteria comprises a minimal thickness of conductor branches of said plurality of conductor branches.

Including a minimal thickness may ensure easier manufacturing (e.g. via additive manufacturing) and/or minimal robustness of the electrical conductor, which is advantageous.

In embodiments of the invention, said minimal thickness is from 0.1 mm to 1 cm, such as from 0.2 mm to 0.6 cm.

By having a resonance vibration frequency as a constraint, it may advantageously be possible to avoid an undesirable resonance vibration frequency of the electrical conductor, which is advantageous. Further, it may advantageously permit to defining an approximate frequency at which vibrational damping occurs, since damping typically occurs at frequencies above a resonance vibration frequency.

A resonance vibration frequency may for example be in any of the lengthwise direction and of the transversal directions.

In embodiments of the invention, said method comprises a step of conducting current between said first end segment and said second end segment.

In embodiments of the invention, said step of conducting current between said first end segment and said second end segment is a step of conducting AC current between said first end segment and said second end segment.

In embodiments of the invention, said step of conducting current between said first end segment and said second end segment is a step of conducting DC current between said first end segment and said second end segment.

In embodiments of the invention, said step of conducting current comprises transferring AC power, wherein a ratio of a minimum cross-sectional area of said electrical conductor to said AC power is at most 350 square millimeters per megawatt, for example at most 300 square millimeters per megawatt, for example at most 250 square millimeters per megawatt, such as at most 200 square millimeters per megawatt.

The geometry provided by embodiments of the invention may potentially permit advantageously reducing the minimum cross-sectional area of the electrical conductor, relatively to the conducted current. The minimum cross-sectional area may be understood as the smallest of any cross-sectional areas in planes perpendicular to a lengthwise direction An aspect of the invention relates to use of digital geometry optimization for at least partly forming a digital representation of an electrical conductor, wherein a physical electrical conductor of an electrical installation of a renewable energy facility is based on said digital representation of said electrical conductor.

Using digital geometry optimization such as topology optimization, shape optimization, or a generative design process for forming/designing an electrical conductor of a renewable energy facility is advantageous since it may permit tailoring the electrical conductor to the conditions of the renewable energy facility.

The physical electrical conductor may be based on the digital representation via manufacturing the physical electrical conductor based on a design obtained from the digital representation.

In embodiments of the invention, said physical electrical conductor is an electrical conductor according to any of the embodiments of this disclosure.

In the following various embodiment of an electric conductor according to the invention having different material compositions are described.

In embodiments of the invention, said different material compositions are different metal compositions, such as different metals.

In embodiments of the invention, a mass density of said outer support structure is larger than a mass density of said inner bulk structure.

In embodiments of the invention, a material of said outer surface structure is copper, silver, or gold.

In embodiments of the invention, a material of said inner bulk structure is aluminum or tin.

Having an electrical conductor with an outer surface structure having a larger conductance than an inner bulk structure is advantageous, since it may permit reducing excess material of the outer surface structure, while maintaining structural support of an inner bulk structure. Such an electrical conductor may for example have a cylindrical shape, with an axis of the cylindrical shape in the longitudinal direction, and the outer surface structure corresponding to a hollow cylindrical shape around the inner bulk structure.

From the above, it is now clear that the invention relates to an electrical conductor, such as a busbar, which has a middle segment with a branched topology. This may potentially permit improved vibrational damping, heat dissipation, thermal expansion capabilities, conductance, and visibility, while potentially reducing the amount of material required.

The invention has been exemplified above with the purpose of illustration rather than limitation with reference to specific examples of electrical conductors and methods. Details such as a specific method and system structures have been provided in order to understand embodiments of the invention. Note that detailed descriptions of well-known systems, devices, circuits, and methods have been omitted so as to not obscure the description of the invention with unnecessary details. It should be understood that the invention is not limited to the particular examples described above and a person skilled in the art can also implement the invention in other embodiments without these specific details. Thus, embodiments disclosed in the figures and the description can be combined in any way. As such, the invention may be designed and altered in a multitude of varieties within the scope of the invention as specified in the claims.

LIST OF REFERENCE SIGNS 1 electrical conductor
2 first end segment
3 second end segment
4 middle segment
5 conductor branch
6 interior corner
7 spatial separation
8 transversal direction
9 lengthwise direction
10 branch diameter
11 neighbor spacing
12 corner radius
13 branch stem
14 branch twig
15 transversal plane
16 cooling channel
17 channel opening
18 line
19 inner bulk structure
20 outer surface structure
21 central body segment
22 transversal branch outgrowth
23 fastener hole
24 intersession points
25 air guiding fin
26 direction of air flow
27 cooling structure
28 additional electric component (e.g. solid or flexible busbar)
29 nut and bolt
30 ferrite core
31 web like structure of conductor
32 inductor/coiled part

The invention claimed is:

1. An electrical conductor for an electrical installation, said electrical conductor comprising:
a first end segment;
a second end segment; and
a middle segment formed by a plurality of conductor branches which electrically couples and mechanically couples said first end segment and said second end segment,
wherein said first end segment and conductor branches of said plurality of conductor branches are monolithically united by connections thus shaping interior corners between said first end segment and conductor branches of said plurality of conductor branches and spatially separating conductor branches of said plurality of conductor branches in two different transversal directions,
wherein said electrical conductor is at least partly manufactured by an additive manufacturing process, wherein at least one of the plurality of conductor branches includes:
a stem end, and
a forked end of one or more forked branches, opposite the stem end, and
wherein the middle segment has a geometry that is one of:
a web-structure, a honeycomb-structure, an organic branch structure, or a bionic branch structure.

2. The electrical conductor according to claim 1, wherein said interior corners are formed as concavely rounded interior corners.

3. The electrical conductor according to claim 1, wherein said plurality of conductor branches are monolithically united via said first end segment and via said second end segment.

4. The electrical conductor according to claim 1, wherein said plurality of conductor branches form a web structure between said first end segment and said second end segment.

5. The electrical conductor according to claim 1, wherein said plurality of conductor branches are mutually twisted without physical contact between individual conductor branches in a longitudinal direction of the middle segment.

6. The electrical conductor according to claim 1, wherein said electrical conductor comprises a cooling structure extending from a longitudinal direction of said middle segment.

7. The electrical conductor according to claim 1, wherein one or more conductor branches of said plurality of conductor branches have an internal cooling channel.

8. The electrical conductor according to claim 1, wherein two conductor branches of said plurality of conductor branches are mechanically coupled and electrically coupled by a transversal branch outgrowth.

9. The electrical conductor according to claim 1, wherein said middle segment is a first middle segment, and
wherein said electrical conductor further comprises a second middle segment formed by a second plurality of conductor branches which also electrically couples and mechanically couples said first end segment and said second end segment.

10. The electrical conductor according to claim 1, wherein said electrical conductor further comprises two or more central body segments, and
wherein the geometry of the conductor branches connected to a same central body segment are different.

11. The electrical conductor according to claim 1, wherein said electrical conductor has a resonance vibration frequency associated with relative motion between said first end segment and said second end segment, wherein said resonance vibration frequency is at most 300 Hz.

12. The electrical conductor according to claim 1, wherein said electrical conductor comprises an inner bulk structure and an outer surface structure, and
wherein said inner bulk structure and said outer surface structure have different material compositions.

13. An electrical installation for a renewable energy facility, said electrical installation comprising an electrical conductor according to claim 1.

14. The electrical conductor according to claim 1, wherein the one or more forked branches are monolithic with the first end segment or with the second end segment.

15. The electrical conductor according to claim 1, wherein the stem end is monolithic with the first end segment or with the second end segment.

16. The electrical conductor according to claim 1, wherein the plurality of conductor branches, are disposed in two different parallel transversal planes, defined in a lengthwise direction between the first end segment and the second end segment, and are positioned differently.

17. The electrical conductor according to claim 1, wherein a first portion of the plurality of conductor branches facilitates a majority of current power transfer and as second portion of the plurality of conductor branches provides mechanical support.

18. The electrical conductor according to claim 1, wherein at least two of the plurality of conductor branches have different cross-sectional areas or different shapes.

19. A method for coupling a first end segment of an electrical conductor to a second end segment of said electrical conductor within an electrical installation, said method comprising steps of:

monolithically uniting said first end segment and conductor branches of a plurality of conductor branches via connections to shape interior corners between said first end segment and conductor branches of said plurality of conductor branches and to spatially separate conductor branches of said plurality of conductor branches in two different directions, and electrically coupling and mechanically coupling said first end segment and said second end segment via a middle segment of said electrical conductor formed by said plurality of conductor branches, wherein said method further comprises a step of establishing a digital representation of said electrical conductor, wherein at least one of the plurality of conductor branches includes:

a stem end, and a forked end of one or more forked branches, opposite the stem end, and wherein the middle segment has a geometry that is one of:

a web-structure, a honeycomb-structure, an organic branch structure, or a bionic branch structure.

20. The method according to claim 19, wherein said connections are rounded connections shaping concavely rounded interior corners between said first end segment and said conductor branches of said plurality of conductor branches.

21. The method according to claim 19, wherein said method further comprises a step of performing digital geometry optimization of said digital representation of said electrical conductor to at least partially form said plurality of conductor branches.

22. The method according to claim 19, wherein said method further comprises a step of additively manufacturing said electrical conductor based on said digital representation of said electrical conductor.

23. An electrical conductor comprising:

a first end segment;

a second end segment; and a middle segment including a plurality of conductor branches electrically and mechanically coupled to the first end segment and the second end segment, wherein the first end segment and a portion of conductor branches of the plurality of conductor branches are monolithically united by connections thus shaping a conductor with spatially separated conductor branches in two different transversal directions, wherein the plurality of conductor branches are mutually twisted, wherein the electrical conductor is at least partly manufactured by an additive manufacturing process, wherein at least one of the plurality of conductor branches includes:

a stem end, and a forked end of one or more forked branches, opposite the stem end, and wherein the middle segment has a geometry that is one of:

a web-structure, a honeycomb-structure, an organic branch structure, or a bionic branch structure.

* * * * *